United States Patent
Otsuki et al.

(10) Patent No.: US 7,283,889 B2
(45) Date of Patent: Oct. 16, 2007

(54) NUMERICAL CONTROL DEVICE, AND NUMERICAL CONTROL METHOD

(75) Inventors: Toshiaki Otsuki, Hino (JP); Hideo Ogino, Fujiyoshida (JP); Takafumi Sasaki, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 398 days.

(21) Appl. No.: 10/776,248

(22) Filed: Feb. 12, 2004

(65) Prior Publication Data

US 2005/0107000 A1   May 19, 2005

(30) Foreign Application Priority Data

Feb. 19, 2003   (JP) .............................. 2003-041249

(51) Int. Cl.
G05B 19/42   (2006.01)

(52) U.S. Cl. .................................. 700/186; 700/193

(58) Field of Classification Search ................ 700/186, 700/192–195

See application file for complete search history.

(56) References Cited

U.S. PATENT DOCUMENTS

| 4,808,048 | A | * | 2/1989 | Miller | 409/239 |
| 6,909,517 | B2 | * | 6/2005 | Coleman et al. | 356/620 |
| 2002/0049514 | A1 | * | 4/2002 | Puchtler | 700/245 |

FOREIGN PATENT DOCUMENTS

JP   56-159707   12/1981

JP   3-66549   3/1991

(Continued)

OTHER PUBLICATIONS

Bohez, E.L.J., "Compensating for Systematic Errors in 5-Axis NC Machining", Computer Aided Design, Elsevier Publishers, vol. 34, No. 5, Apr. 15, 2002.

(Continued)

*Primary Examiner*—Zoila Cabrera
(74) *Attorney, Agent, or Firm*—Staas & Halsey LLP

(57) ABSTRACT

A machine has a tool head which rotates on a C-axis (about the Z-axis) and an A-axis (about the X-axis). A tool length vector is multiplied by a matrix whereby a misalignment component $\delta s_{-H}$ and the incline error ($\alpha s_{-H}$, $\beta s_{-H}$, $\gamma s_{-H}$) of a spindle are corrected so that the tool length vector due to the misalignment of the spindle is obtained. The vector thus obtained is further multiplied by a transformation matrix that includes a rotation instruction $\alpha$ for the A-axis and misalignments of the A-axis $\delta a_{-H}$ ($\alpha a_{-H}$, $\beta a_{-H}$, $\gamma a_{-H}$) to correct the misalignment of the A-axis so that the tool length vector as found when the A-axis has rotated by an equivalent of instruction $\alpha$ is determined. The vector thus determined is further multiplied by a transformation matrix that includes a rotation instruction c for the C-axis and misalignments of the C-axis $\delta ac_{-H}$ ($\alpha c_{-H}$, $\beta c_{-H}$, $\gamma c_{-H}$) to correct the misalignment of the C-axis, so that a tool length vector as found when the C-axis has rotated by an equivalent of instruction c is determined. The tool length vector thus determined is added to the vector of positional instruction values (x, y, z) and a workpiece origin offset vector $Mwo_{-H}$, so that the machine position $Vm_{-H}'$ is obtained.

3 Claims, 11 Drawing Sheets

FOREIGN PATENT DOCUMENTS

| | | |
|---|---|---|
| JP | 3-109606 | 5/1991 |
| JP | 5-100723 | 4/1993 |
| JP | 7-299697 | 11/1995 |
| JP | 10-337636 | 12/1998 |
| JP | 2001-269839 | 10/2001 |

OTHER PUBLICATIONS

Soons, J. A., et al., "Modeling the Errors of Multi-Axis Machines: A General Methodology", Precision Engineering, vol. 14, No. 1, Jan. 1992, pp. 5-19.

Notice of Reasons for Rejection dated May 31, 2005.

* cited by examiner

NUMERICAL CONTROL DEVICE, AND NUMERICAL CONTROL METHOD

BACKGROUND OF THE INVENTION

1. Field of the Invention

The present invention relates to a numerical control device for controlling a machine having an axis of rotation other than an axis of linear motion, and a numerical control method thereof.

2. Description of the Related Art

Machines having an axis of rotation other than an axis of linear motion are used as machine tools that work the free form surfaces of molds and the like. Five-axis machine tools equipped with two rotating axes and linearly moving axes X, Y, and Z are known. Because such machines are equipped with rotating axes, tools can be tilted to work in any direction with respect to the work surface of the workpiece in association with the rotation of these rotating axes. Because the amount of compensation to the tool length changes due to the tilting of the tool, work is performed while compensating for the tool length (Refer to Japanese Patent Application Laid-open Nos. H3-109606 and H5-100723, for example).

Known is an invention (Japanese Patent Application Laid-open No. 2001-269839) for corrects the spindle head error in a five-axis machine tool equipped with members that rotate about the linearly moving axes X, Y, and Z, with a C-axis, which is the axis of rotation about the vertical axis line, and with a B'-axis inclined at a prescribed angle with respect to the C-axis, by fixing the B'-axis at a prescribed angle; measuring the spindle end position for each prescribed swivel angle when rotating a member about the C-axis; performing a multiple regression analysis with a regression equation and computing the swivel plane from this measurement data; computing the axial vector of the C-axis member; fixing the C-axis at a prescribed angle; measuring the spindle end position at every prescribed swivel angle when swiveling a member about the B-axis; performing a multiple regression analysis with a regression equation, computing the swivel plane from this measurement data, and computing the axial vector of the B-axis member; computing the spindle end position in a state in which the members swivel about the axis lines of these axial vectors; taking the difference between this spindle end position and the precise spindle position as the spindle head position error; inverting the sign of the spindle head position error and using the result as the correction value; and offsetting the coordinate system of an NC program in order to correct the tilt error from the vertical axis line of the C-axis, the incline angle error of the B'-axis, and the error in the position of the center of rotation of the B'- and C-axes.

The tool length correction methods cited in the above-mentioned Japanese Patent Application Laid-open Nos. H3-109606 and H5-100723 do not take the incline and misalignment of the center of an axis of rotation into consideration. Cases in which the center of an axis of rotation diverges or becomes inclined from the original position (cases in which the control system for executing a work program has an error between the recognized center axis of rotation and the direction thereof, and the actual center axis of rotation and the direction thereof) are not taken into consideration. Also not taken into consideration is the case in which the center of swiveling about the main axis diverges or becomes inclined from the original position.

However, it is difficult to accurately manufacture the center of an axis of rotation in the original position and direction, and the turning center of the spindle in the original position and direction because of factors related to the manufacture of machine tools, and errors occur. In the above-described Japanese Patent Application Laid-open No. 2001-269839, the center position error of the axis of rotation and the tilt error are taken into consideration, and the error of the spindle head position is corrected, but with this method, one of two axes of rotation is fixed, a multiple regression analysis is performed with a regression equation on the basis of the data obtained from measuring the spindle end position for each position in which the other axis is rotated at a prescribed angle, the swivel plane is computed, the axial vector is computed, the spindle end position is computed in a state in which these axial vectors are swiveled; the difference with the original spindle position is taken to be the spindle head position error; and the NC coordinate system is offset in accordance with the spindle head position error, resulting in complicated processing.

The method cited in the Japanese Patent Application Laid-open No. 2001-269839 has the following drawbacks.

For each positioning of the two axes of rotation, these axes are swiveled a prescribed angle and measured each time, and the actual direction vectors of the axes of rotation thereof are computed. Therefore, this approach is disadvantageous in that time is required for measurement each time the axes of rotation are positioned, and that the invention cannot be used in continuous working that includes movement of the axes of rotation. Assuming that the centers of rotation of the two axes of rotation intersect with each other, no consideration is given to the case when there is divergence between the two centers of rotation. Another drawback is that no consideration is given to the error between the center of rotation of the spindle and the axis of rotation.

SUMMARY OF THE INVENTION

The numerical control device according to the present invention relates to a numerical control device for controlling a machine having an axis of linear motion and at least one axis of rotation on a tool head or a table. This numerical control device has means for obtaining a machine position to which a machine should actually move so that the relation between a workpiece and a tool as found when there is no mechanical error is maintained on the basis of a reference position at which there is no mechanical error in the axis of rotation and an amount of misalignment of an actual axis of rotation from the reference position, and/or on the basis of a reference position at which there is no mechanical error in the turning center of the spindle and an amount of misalignment of an actual turning center of the spindle from the reference position of the turning center of the spindle; and drive control means for driving the axis of rotation and the axis of linear motion to the machine position obtained by the machine position obtaining means.

This numerical control device may take the following embodiments.

The machine is one in which the tool head rotates about at least one axis, one in which the table rotates about at least one axis, or one in which the tool head and the table rotate.

The amount of misalignment is set by a parameter in the numerical control device.

The amount of misalignment is delivered to the numerical control device by a signal from the machine to the numerical control device, or is reported to the numerical control device by a signal from external equipment to the numerical control device.

The numerical control method according to the present invention relates to a numerical control method that uses a numerical control device for a machine having an axis of linear motion and at least one axis of rotation on a tool head or a table. This numerical control method has a step of obtaining a machine position to which a machine should actually move so that the relation between a workpiece and a tool as found when there is no mechanical error is maintained on the basis of a reference position at which there is no mechanical error in the axis of rotation and an amount of misalignment of an actual axis of rotation from the reference position, and/or on the basis of a reference position at which there is no mechanical error in the turning center of the spindle and an amount of misalignment of an actual turning center of the spindle from the reference position of the turning center of the spindle; and a step of moving the axis of linear motion and the axis of rotation to the machine position thus obtained.

This numerical control method may take the following embodiments.

The machine is one in which a tool head rotates about at least one axis, and the method has a step of correcting the tool length vector on the basis of a reference position at which there is no mechanical error in the axis of rotation and an amount of misalignment of an actual axis of rotation from the reference position, and/or a reference position at which there is no mechanical error in the turning center of the spindle, an amount of misalignment of an actual turning center of the spindle from the reference position of the turning center of the spindle, and instruction for the axis of rotation; and a step of adding the instruction position vector to the corrected tool length vector to obtain the machine position.

The machine is one in which a table rotates about at least one axis, and the method has a step of adding an offset of the origin of a table coordinate system to an instruction position value in the table coordinate system and computing the instruction position in the machine coordinate system; and a step of correcting the misalignment of the instruction position in the machine coordinate system on the basis of a reference position at which there is no mechanical error in the axis of rotation, an amount of misalignment of the actual axis of rotation from the reference position, and the instruction position for the axis of rotation, obtaining a rotation position to which the axis of rotation has rotated according to the instruction, and adding the tool length vector to the position to obtain the machine position.

The machine is one in which a tool head and a table rotate, and the method has a step of adding an offset of the origin of a table coordinate system to a position instruction in the table coordinate system and obtaining an instruction position in the machine coordinate system; a step of obtaining an instruction position for which the misalignment has been corrected on the basis of an amount of misalignment of the actual axis of rotation provided to the table from a reference position at which there is no mechanical error in the axis of rotation and an instruction position for the axis of rotation; a step of obtaining an actual tool length vector of the tool for which misalignment has been corrected on the basis of an amount of misalignment of the actual axis of rotation provided to the tool head from a reference position at which there is no mechanical error in the axis of rotation and the instruction position of the axis of rotation, in addition to a tool vector; and a step of obtaining a machine position on the basis of an instruction position for which the misalignment has been corrected and an actual tool length vector of the tool for which the misalignment has been corrected.

The amount of misalignment is delivered to the numerical control device by a parameter setting in the numerical control device, a signal from the machine, or a signal from external equipment.

According to the present invention, there is provided a numerical control device and a numerical control method that are simple, are capable of high precision working, and can perform continuous working that includes movement of an axis of rotation, even when the center of an axis of rotation diverges or is inclined from the original position, or when the turning center of the spindle diverges or is inclined from the original position in a numerical control device for controlling a machine that includes the axis of rotation.

DESCRIPTION OF THE PREFERRED EMBODIMENTS

Machines (machine tools) that have axes of rotation exist in multiple types (structural differences). The embodiments in which the present invention is adapted to each type of machine are demonstrated with applications to three types of machines, namely, tool head rotary machines, table rotary machines, and tool head and table rotary machines, and the basic principles of the present invention comprising these three embodiments are described below.

1. Embodiment 1 of the Present Invention (Tool Head Rotary Machines)

The first embodiment of the present invention is a tool head rotary machine having orthogonal axes of linear motion X, Y, and Z; the tool head is provided with an A-axis (rotating about the X-axis) and a C-axis (rotating bout the Z-axis) as axes of rotation; the C-axis is the master axis; the A-axis operates on the C-axis; and the tool direction is the Z-axis direction when the angle of the A- and C-axes is "0."

The tool length vector $Vt_{\_H}(0, 0, h, 1)^T$ and the workpiece origin offset $WO_{\_H}(WOx_{\_H}, WOy_{\_H}, WOz_{\_H}, 1)^T$ when the angle of rotation of the A-axis and the C-axis is "0" are given as the initial conditions. The symbol "$T$" in a homogeneous coordinate system hereinafter refers to transposition.

(1-1) Method for Computing the Machine Position when there is No Misalignment

Following is a description of a misalignment-free case in which the center of an axis of rotation and the turning center of the spindle have no tilt or position misalignment, and have no divergence or inclination from the original position, that is to say, a case in which the actual position and direction are aligned with the position and direction of the center of the axis of rotation or the turning center of the spindle recognized by the work program and the control system.

Figure 1:
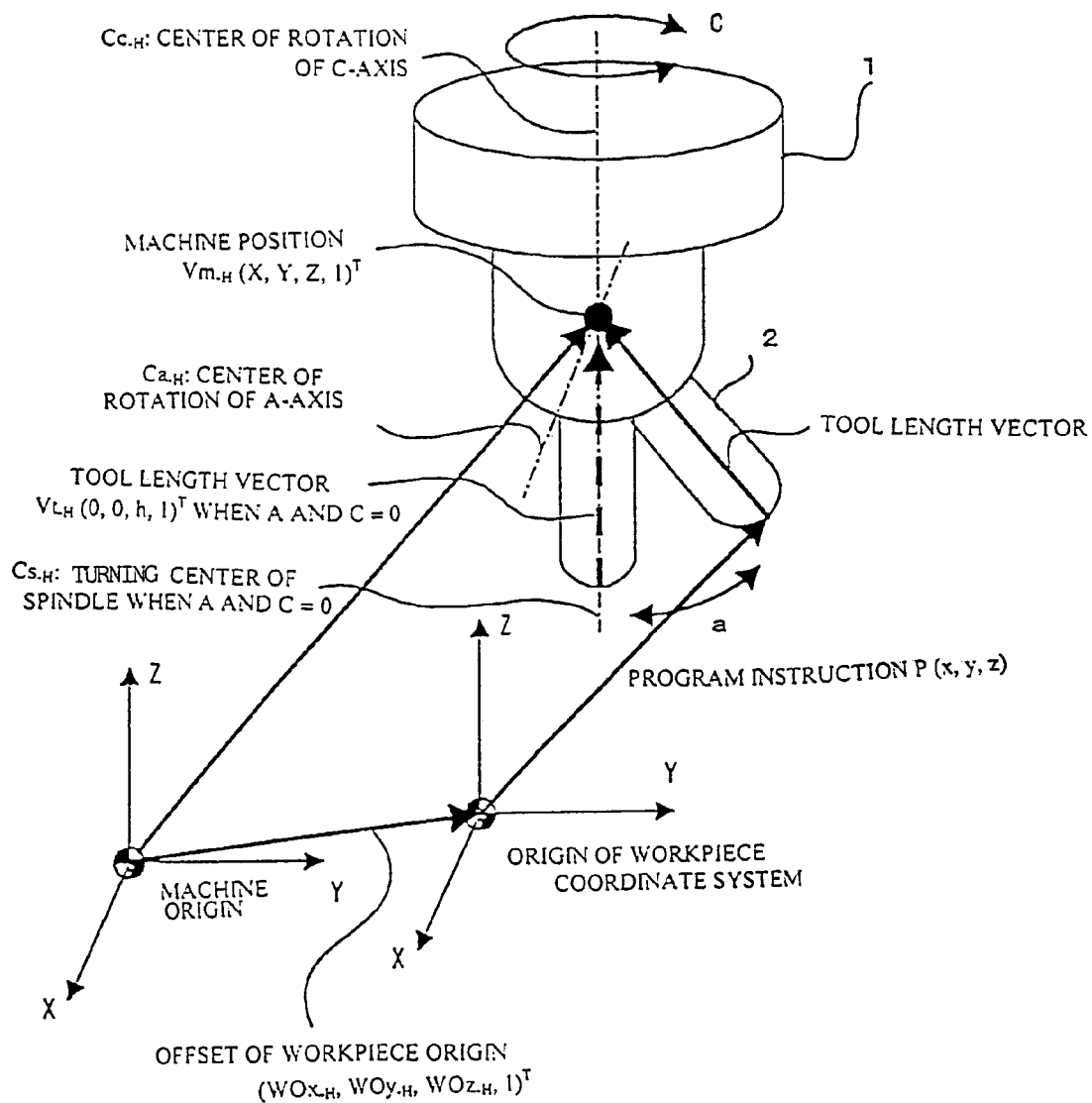
FIG. 1 is a diagram illustrating the calculation of a machine position in a machine having axes of rotation A and C when there is no misalignment.

FIG. 1 is a diagram illustrating the calculation of a machine position in a machine having axes of rotation A and C when there is no misalignment. Reference numerals 1 and 2 denote a tool head and a tool.

When the positional instruction values P (x, y, z) are given to the X-, Y-, and Z-axes of linear motion, and the positional instructions R (a, c) to the A- and C-axes of rotation, the machine position $Vm_{\_H}(X, Y, Z, 1)^T$ is computed according to the following Eq. (1).

$$Vm_{\_H} = Mwo_{\_H} * Mp_{\_H} * Mc_{\_H} * Ma_{\_H} * Vt_{\_H} \qquad (1)$$

In the expression, $Mwo_{\_H}$, $Mp_{\_H}$, $Mc_{\_H}$, $Ma_{\_H}$ are transformation matrices, and are as follows.

$$Mwo_{\_H} = \begin{pmatrix} 1 & 0 & 0 & WOx_H \\ 0 & 1 & 0 & WOy_H \\ 0 & 0 & 1 & WOz_H \\ 0 & 0 & 0 & 1 \end{pmatrix}$$

$$Mp_{\_H} = \begin{pmatrix} 1 & 0 & 0 & x \\ 0 & 1 & 0 & y \\ 0 & 0 & 1 & z \\ 0 & 0 & 0 & 1 \end{pmatrix}$$

$$Ma_{\_H} = \begin{pmatrix} 1 & 0 & 0 & 0 \\ 0 & \cos(a) & -\sin(a) & 0 \\ 0 & \sin(a) & \cos(a) & 0 \\ 0 & 0 & 0 & 1 \end{pmatrix}$$

$$Mc_{\_H} = \begin{pmatrix} \cos(x) & -\sin(c) & 0 & 0 \\ \sin(c) & \cos(c) & 0 & 0 \\ 0 & 0 & 1 & 0 \\ 0 & 0 & 0 & 1 \end{pmatrix}$$

In other words, matrix $Mwo_{\_H}$ is determined by the amount of offset $WO_{\_H}(WOx_{\_H}, WOy_{\_H}, WOz_{\_H}, 1)^T$ from the workpiece origin that is given as the initial condition, and matrix $Mp_{\_H}$ is computed with the positional instruction value P (x, y, z). Matrix $Mc_{\_H}$ is computed with the aid of the instruction c for the C-axis of rotation, and matrix $Ma_{\_H}$ is computed with the aid of the instruction a for the A-axis of rotation.

The vector of the amount of offset $WO_{\_H}$ from the workpiece origin thus set is added to the machine origin, and the position of the origin in the workpiece coordinate system is computed, as shown in FIG. 1. The machine position $Vm_{\_H}(X, Y, Z, 1)^T$ is computed by adding, to the position of the origin in the workpiece coordinate system, the vector corresponding to the instruction value P (x, y, z), and further the tool length vector obtained by rotating the tool length vector $Vt_{\_H}(0, 0, h, 1)^T$ assumed when an amount of rotation of A- and C-axes are zero by amounts of the rotation instructions a and c about the A- and C-axes.

(1-2) Elements of Misalignment (Divergence and Incline of the Position of the Center Axis of Rotation and the Turning Center of the Spindle)

Figure 2:
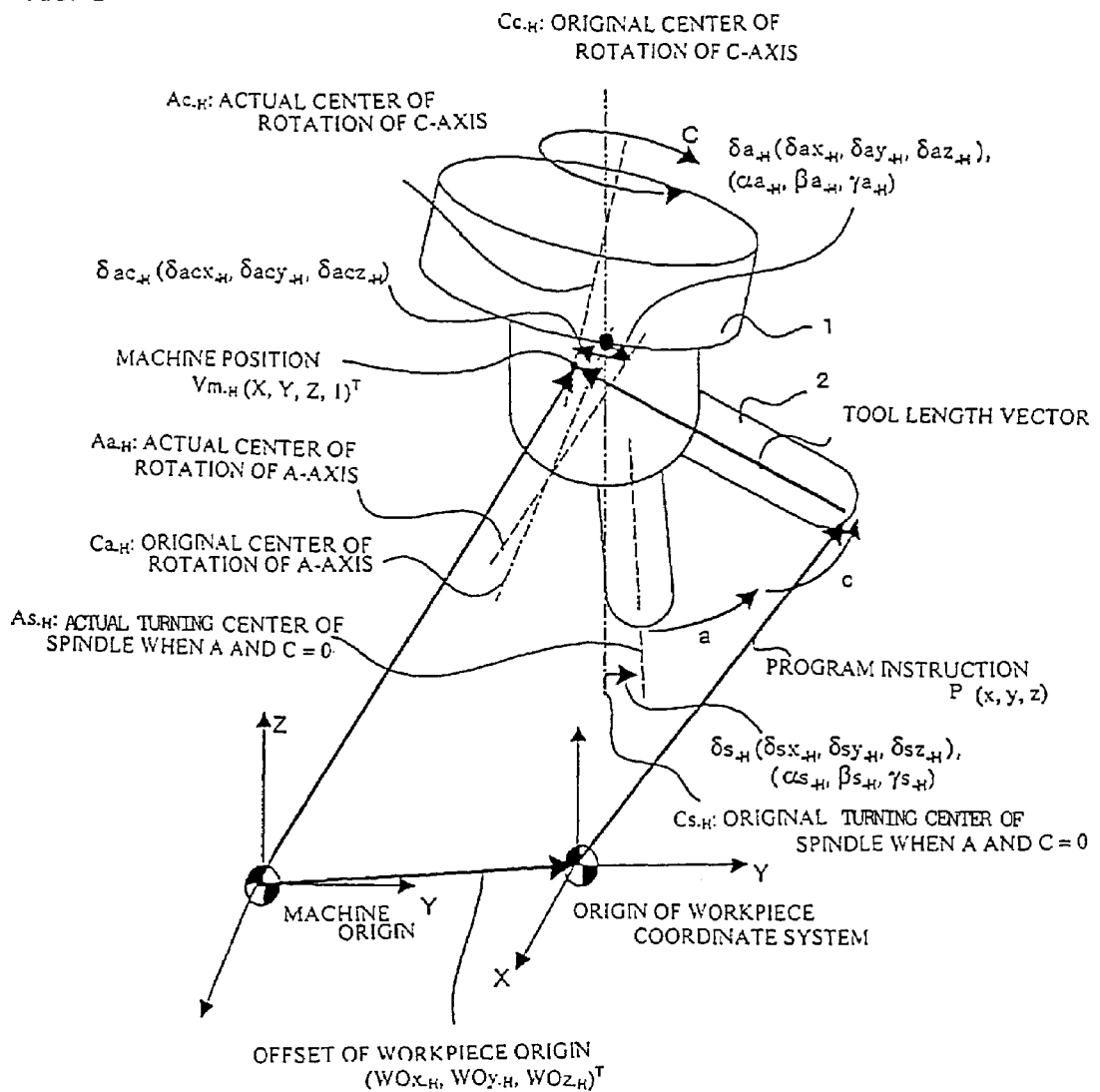
FIG. 2 is a diagram illustrating the calculation of the machine position when the machine in FIG. 1 has misalignment.

The misalignment that occurs in the first embodiment includes (i) misalignment of the center of rotation of the C-axis, (ii) misalignment of the center of rotation of the A-axis, and (iii) misalignment of the turning center of the spindle. Related items for these misalignments are represented by the following symbols. FIG. 2 is a diagram illustrating the calculation of the position of a machine having this misalignment.

$As_{\_H}$: Actual turning center of the spindle when A=0 and C=0

$Cs_{\_H}$: Original turning center of the spindle (reference position) when A=0 and C=0

$Ac_{\_H}$: Actual center of rotation of the C-axis $Cc_{\_H}$: Original center of rotation of the C-axis (reference position)

$Aa_{\_H}$: Actual center of rotation of the A-axis $Ca_{\_H}$: Original center of rotation of the A-axis (reference position)

Here, it is assumed that the axis of the original center of rotation of the C-axis (reference position) $Cc_{\_H}$ is orthogonal to the axis of the original center of rotation of the A-axis (reference position) $Ca_{\_H}$.

(i) Misalignment (misalignment of the C-axis) of the actual center of rotation of the C-axis $Ac_{\_H}$ with respect to the original center of rotation of the C-axis (reference position) $Cc_{\_H}$ This misalignment is represented by the component $\delta ac_{\_H}$ ($\delta acx_{\_H}$, $\delta acy_{\_H}$, $\delta acz_{\_H}$) of the X-, Y-, and Z-axes of the distance of divergence from the actual center of rotation of the A-axis $Aa_{\_H}$ to the actual center of rotation of the C-axis $Ac_{\_H}$, and the rotational misalignment ($\alpha c_{\_H}$, $\beta bc_{\_H}$, $\gamma c_{\_H}$) of the center of rotation of the C-axis about these X-, Y-, and Z-axes of rotation. Here, $$\delta ac_{\_H} (\delta acx_{\_H}, \delta acy_{\_H}, \delta acz_{\_H})$$

is the vector from the actual center of rotation of the A-axis to the actual center of rotation of the C-axis. If it is assumed that the vector to the actual center of rotation of the C-axis $Ac_{\_H}$ from the intersection between the original center of rotation of the C-axis (reference position) $Cc_{\_H}$ and the original center of rotation of the A-axis $Ca_{\_H}$ is $\delta c_{\_H}$ ($\delta cx_{\_H}$, $\delta cy_{\_H}$, $\delta cz_{\_H}$), then $\delta ac_{\_H} = -\delta a_{\_H} + \delta c_{\_H}$ ($\delta a_{\_H}$ will be described hereinafter). Also, $$(\alpha ac_{\_H}, \beta c_{\_H}, \gamma c_{\_H})$$

represents the misalignment whereby the actual center of rotation of the C-axis $Ac_{\_H}$ is inclined by rotating $\alpha c_{\_H}$ about the X-axis, $\beta c_{-H}$ about the Y-axis and $\gamma c_{-H}$ about the Z-axis from the original center of rotation of the C-axis $Cc_{-H}$.

(ii) Misalignment (Misalignment of the A-axis) of the Actual Center of Rotation of the A-axis $Aa_H$ with Respect to the Original Center of Rotation of the A-axis (Reference Position) $Ca_H$ This misalignment is represented by the misalignment $\delta a_H$ ($\delta ax_{-H}$, $\delta ay_{-H}$, $\delta az_{-H}$) of the X-, Y-, and Z-axes in the linear axis direction and by the rotational misalignment ($\alpha a_{-H}$, $\beta a_{-H}$, $\gamma a_{-H}$) of the center of rotation of the A-axis about the X-, Y-, Z-axes. Here, $$\delta a_H (\delta ax_{-H}, \delta ay_{-H}, \delta az_{-H})$$

represents the components of the distance of divergence in the direction of the X-, Y-, and Z-axes from the original center of rotation of the A-axis $Ca_H$ to the actual center of rotation of the A-axis $Aa_H$ (the vector from the intersection between the original center of rotation of the C-axis $Cc_H$ and the original center of rotation of the A-axis $Ca_H$ to the actual center of rotation of the A-axis). Also, $$(\alpha a_{-H}, \beta a_{-H}, \gamma a_{-H})$$

represents the error whereby the actual center of rotation of the A-axis $Aa_H$ is inclined by rotating $\alpha a_{-H}$ about the X-axis, $\beta a_{-H}$ about the Y-axis and $\gamma a_{-H}$ about the Z-axis from the original center of rotation of the A-axis $Ca_{-H}$.

(iii) Misalignment (Misalignment of the Spindle) of the Actual Turning Center of the Spindle $As_{-H}$ with Respect to the Original Turning Center of the Spindle (Reference Position) $Cs_{-H}$ This misalignment is represented by the misalignment $\delta s_H$ ($\delta sx_{-H}$, $\delta sy_{-H}$, $\delta sz_{-H}$) in the linear axis direction of the X-, Y-, and Z-axes and the rotational misalignment $\epsilon s_{-H}$ ($\alpha s_{-H}$, $\beta s_{-H}$, $gs_{-H}$) of the turning center of the spindle about these axes. Here, $$\delta s_H (\delta sx_{-H}, \delta sy_{-H}, \delta sz_{-H})$$

represents the components of the distance of divergence in the direction of the X-, Y-, and Z-axes from the actual turning center of the spindle $As_{-H}$ to the original turning center of the spindle $Cs_{-H}$ (the vector from the position obtained by extending the distance by the tool length portion (h) from the tip of the tool at A and C=0 over the actual turning center of the spindle $As_{-H}$ to the intersection between the original center of rotation of the C-axis $Cc_{-H}$ and the original center of rotation of the A-axis $Ca_{-H}$). Also, $$\epsilon s_{-H} (\alpha s_{-H}, \beta s_{-H}, \gamma s_{-H})$$

represents the error whereby the actual turning center of the spindle $As_{-H}$ is inclined by rotating $\alpha s_{-H}$ about the X-axis, $\beta s_H$ about the Y-axis and $\gamma s_{-H}$ about the Z-axis from the original turning center of the spindle $Cs_{-H}$.

Herein and hereinafter, the units of $\alpha$, $\beta$, and $\gamma$ that represent rotational angles are radians.

(1-3) Computing the Machine Position when there is Misalignment

Figure 3:
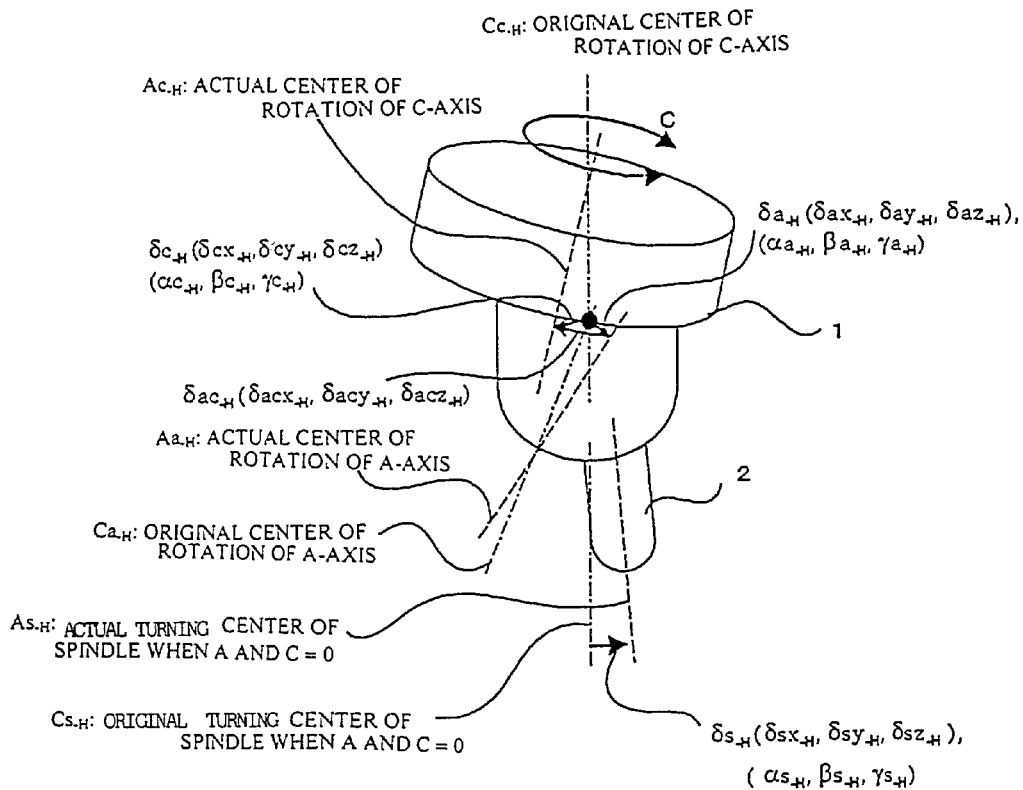
FIG. 3 is an enlarged diagram illustrating the misaligned portion of the machine in FIG. 1.
Figure 4:
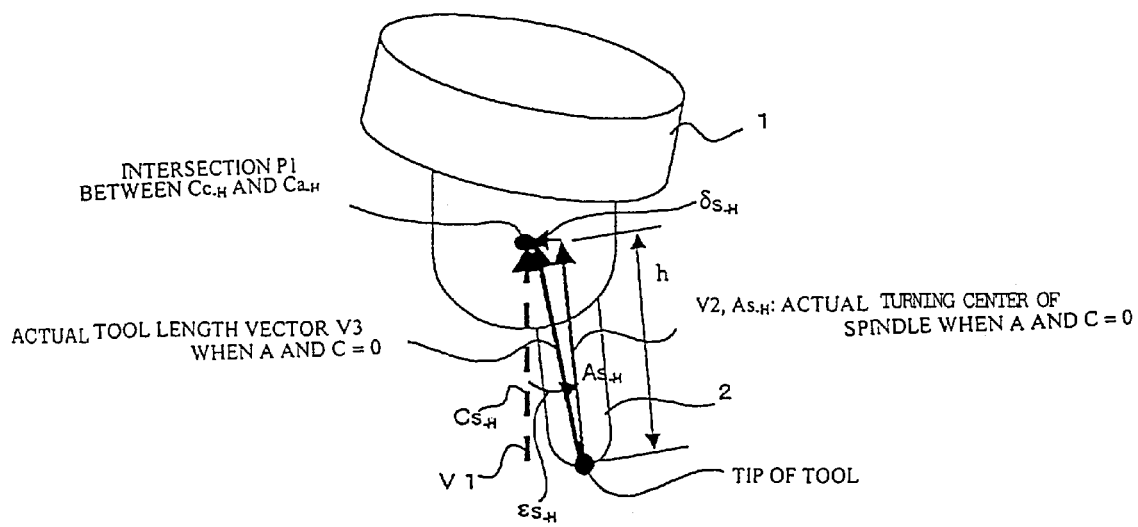
FIG. 4 is a diagram illustrating the change in the tool length vector due to misalignment of the turning center of the spindle in the machine in FIG. 1.
Figure 5:
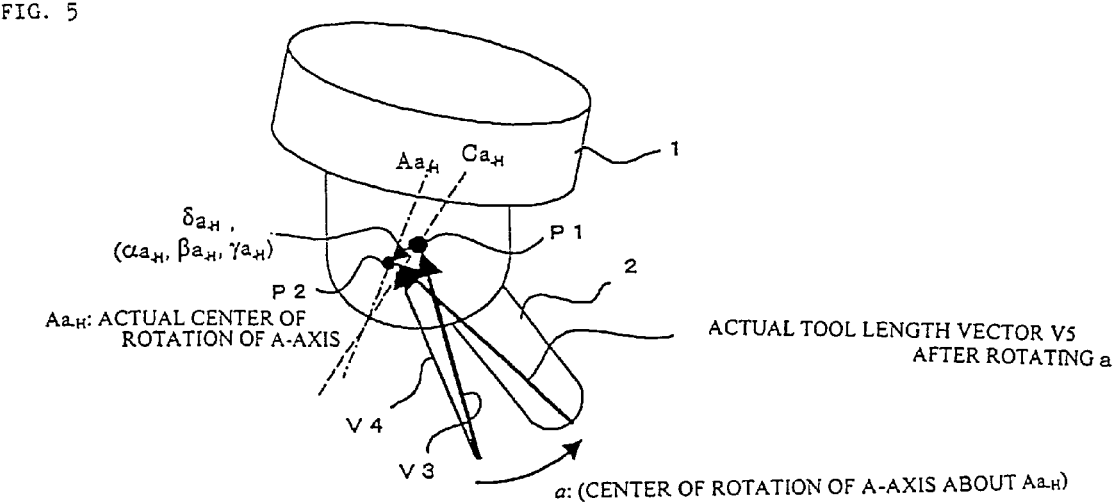
FIG. 5 is a diagram illustrating the change in the tool length vector due to misalignment of the center of rotation of the A-axis and to instruction for the A-axis in the machine in FIG. 1.
Figure 6:
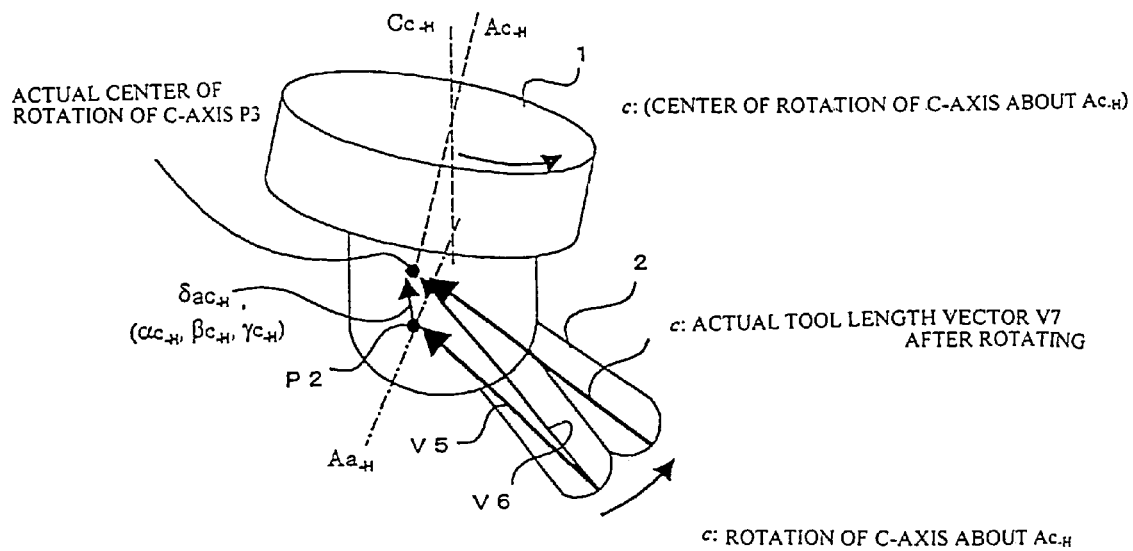
FIG. 6 is a diagram illustrating the change in the tool length vector due to misalignment of the center of rotation of the C-axis and to instruction for the C-axis in the machine in FIG. 1.

When there is misalignment (distance of divergence and amount of rotation for the components of the axes of linear motion) of any one of the three above-described C-axis, A-axis, and the spindle, this misalignment must be taken into consideration to compute the machine position. FIG. 2 is an illustrative diagram in which these misalignments are taken into consideration to compute the machine position, and FIG. 3 is an illustrative diagram in which only the misalignment is shown. FIGS. 4 to 6 are diagrams illustrating the basic principles of taking these misalignments into consideration to compute the machine position.

FIG. 4 shows a situation in which the rotational angle of the axes of rotation A and C are "0." The vector shown by the broken line represents the actual tool length vector V1 from the tip of the tool to the intersection P1 between the original center of rotation of the C-axis $Cc_{-H}$ and the original center of rotation of the A-axis $Ca_H$ in the direction of the original turning center of the spindle $Cs_{-H}$. This vector becomes V2 by way of the incline error $\epsilon s_{-H}$ ($\alpha s_{-H}$, $\beta s_{-H}$, $\gamma s_{-H}$) of the spindle. This vector becomes V3 by way of error $\delta s_{-H}$ ($\delta sx_{-H}$, $\delta sy_{-H}$, $\delta sz_{-H}$) in the linear axis direction of the spindle. That is to say, the vector V3 represents the actual tool length vector of the tool length h from the tip of the tool due to the misalignment of the spindle when the rotational angles of the axes of rotation A and C are "0." This actual tool length vector V3 changes to the vector of V5 shown in FIG. 5 by way of the rotation instruction $\alpha$ for the A-axis and the misalignment of the actual center of rotation of the A-axis $Aa_H$ with respect to the original center of rotation of the A-axis $Ca_{-H}$. In other words, the actual tool length vector V3 computed in FIG. 4 changes to vector V4 due to the rotational misalignment ($\alpha a_{-H}$, $\beta a_{-H}$, $\gamma a_{-H}$) about the X-, Y-, Z-axes and the misalignment $\delta a_H$ ($\delta ax_{-H}$, $\delta ay_{-H}$, $\delta az_{-H}$) of the A-axis in the direction of the X-, Y-, and Z-axes; and the actual center of rotation of the A-axis becomes P2. When a rotation is made by an equivalent of the rotation instruction $\alpha$ for the A-axis, the actual tool length vector after this rotation becomes V5.

This actual tool length vector V5 becomes vector V7 shown in FIG. 6 by way of the rotation instruction c for the C-axis and the misalignment of the actual C-axis center $Ac_{-H}$ with respect to the original C-axis center $Cc_{-H}$. The center of rotation of the C-axis moves to point P3 of FIG. 6, and the actual tool length vector V5 changes to the vector V6 due to the misalignment of the C-axis, that is to say, due to the components $\delta ac_{-H}$ ($\delta acx_{-H}$, $\delta acy_{-H}$, $\delta acz_{-H}$) of the distance of divergence in the direction of the X-, Y-, and Z-axes from the actual center of rotation of the A-axis $Aa_H$ to the actual center of rotation of the C-axis $Ac_{-H}$, and the rotational misalignment ($\alpha c_{-H}$, $\beta c_{-H}$, $\gamma c_{-H}$) about these X-, Y-, and Z-axes. The actual tool length vector is brought to V7 by rotating the tool by an equivalent of the rotation instruction c for the C-axis about point P3. This point P3 becomes the machine position where there is misalignment. The machine position is computed by adding the actual tool length vector V7 at the time when misalignment is corrected and the positional instructions R (a, c) to the A- and C-axes of rotation are executed for the positional instructions P (x, y, z) (refer to FIG. 2).

Thus, the machine position $Vm_{-H}'$ where there is misalignment is computed by calculating the following Eq. (2).

$$Vm_{-H}' = Mwo_{-H}*Mp_{-H}*Mc_{-H}'*\delta ac_{-H}*Ma_{-H}'*\delta a_{-H}*\delta s_{-H}*\epsilon s_{-H}*Vt_{-H} \quad (2)$$

In the above-noted Eq. (2), the transformation matrices $Mwo_{-H}$ and $Mp_{-H}$ are as described above, and other elements are as follows.

$$\epsilon s_{.H} = \begin{pmatrix} 1 & -\gamma s_{.H} & \beta s_{.H} & 0 \\ \gamma s_{.H} & 1 & -\alpha s_{.H} & 0 \\ -\beta s_{.H} & \alpha s & 1 & 0 \\ 0 & 0 & 0 & 1 \end{pmatrix}$$

$$\delta s_{.H} = \begin{pmatrix} 1 & 0 & 0 & \delta sx_{.H} \\ 0 & 1 & 0 & \delta sy_{.H} \\ 0 & 0 & 1 & \delta sz_{.H} \\ 0 & 0 & 0 & 1 \end{pmatrix}$$

$$\delta a_{.H} = \begin{pmatrix} 1 & 0 & 0 & \delta ax_{.H} \\ 0 & 1 & 0 & \delta ay_{.H} \\ 0 & 0 & 1 & \delta az_{.H} \\ 0 & 0 & 0 & 1 \end{pmatrix}$$

$$\delta ac_{.H} = \begin{pmatrix} 1 & 0 & 0 & \delta acx_{.H} \\ 0 & 1 & 0 & \delta acy_{.H} \\ 0 & 0 & 1 & \delta acz_{.H} \\ 0 & 0 & 0 & 1 \end{pmatrix}$$

$$Ma'_{H} = \begin{pmatrix} 1 & \gamma a_{.H}*(1-\cos(a)) - \beta a_{.H}*\sin(a) & -\beta a_{.H}*(1-\cos(a)) - \gamma a_{.H}*\sin(a) & 0 \\ \gamma a_{.H}*(1-\cos(a)) + \beta a_{.H}*\sin(a) & \cos(a) & \sin(a) & 0 \\ -\beta a_{.H}*(1-\cos(a)) + \gamma a_{.H}*\sin(a) & -\sin(a) & \cos(a) & 0 \\ 0 & 0 & 0 & 1 \end{pmatrix}$$

$$Mc'_{H} = \begin{pmatrix} \cos(c) & \sin(c) & \beta c_{.H}*(1-\cos(c)) + \alpha c_{.H}*\sin(c) & 0 \\ -\sin(c) & \cos(c) & -\alpha c_{.H}*(1-\cos(c)) + \beta c_{.H}*\sin(c) & 0 \\ \beta c_{.H}*(1-\cos(c)) - \alpha c_{.H}*\sin(c) & -\alpha c_{.H}*(1-\cos(c)) - \beta c_{.H}*\sin(c) & 1 & 0 \\ 0 & 0 & 0 & 1 \end{pmatrix}$$

Describing the above-noted Eq. (2), the tool length vector $Vt_{.H}$ $(0, 0, h, 1)^T$ that is initially set is multiplied by the transformation matrices of the rotational error $\epsilon s_{.H}$ for the X-, Y-, and Z-axes of the spindle and the X, Y, Z components $ds_{.H}$ of the spindle misalignment to compute the actual tool length vector V3 shown in FIG. 4. The computed vector V3 is multiplied by the misalignment $\delta a_{.H}$ in the X-, Y-, and Z-axes direction of the A-axis and the transformation matrix $Ma_{.H}'$ that includes the rotation instruction α for the A-axis and the rotational misalignment ($\alpha a_{.H}$, $\beta a_{.H}$, $\gamma a_{.H}$) about the X-, Y-, and Z-axes to compute the actual tool length vector V5 shown in FIG. 5.

The computed vector V5 is multiplied by the transformation matrix of the components $\delta ac_{.H}$ of the divergence distance in the direction of the X-,Y-, and Z-axes from the actual center of rotation of the A-axis $Aa_{.H}$ to the actual center of rotation of the C-axis $Ac_{.H}$, and the transformation matrix $Mc_{.H}'$ that includes the rotation instruction c for the C-axis and the rotational misalignment ($\alpha c_{.H}$, $\beta c_{.H}$, $\gamma c_{.H}$) about the X-, Y-, and Z-axes of the C-axis to compute the actual tool length vector V7 shown in FIG. 6.

In a misaligned machine, the machine position $Vm_{.H}'$ in the instruction position for which the misalignment has been corrected is computed by multiplying the computed vector V7 by the matrix $Mp_{.H}$ whereby the vector of the positional instructions P (x, y, z) from the origin in the workpiece coordinate system is added, and by the matrix $Mwo_{.H}$ whereby the machine origin and the workpiece origin offset vector are added, as shown in FIG. 2.

2. Embodiment 2 of the Present Invention (Table Rotary Machines)

Figure 7:
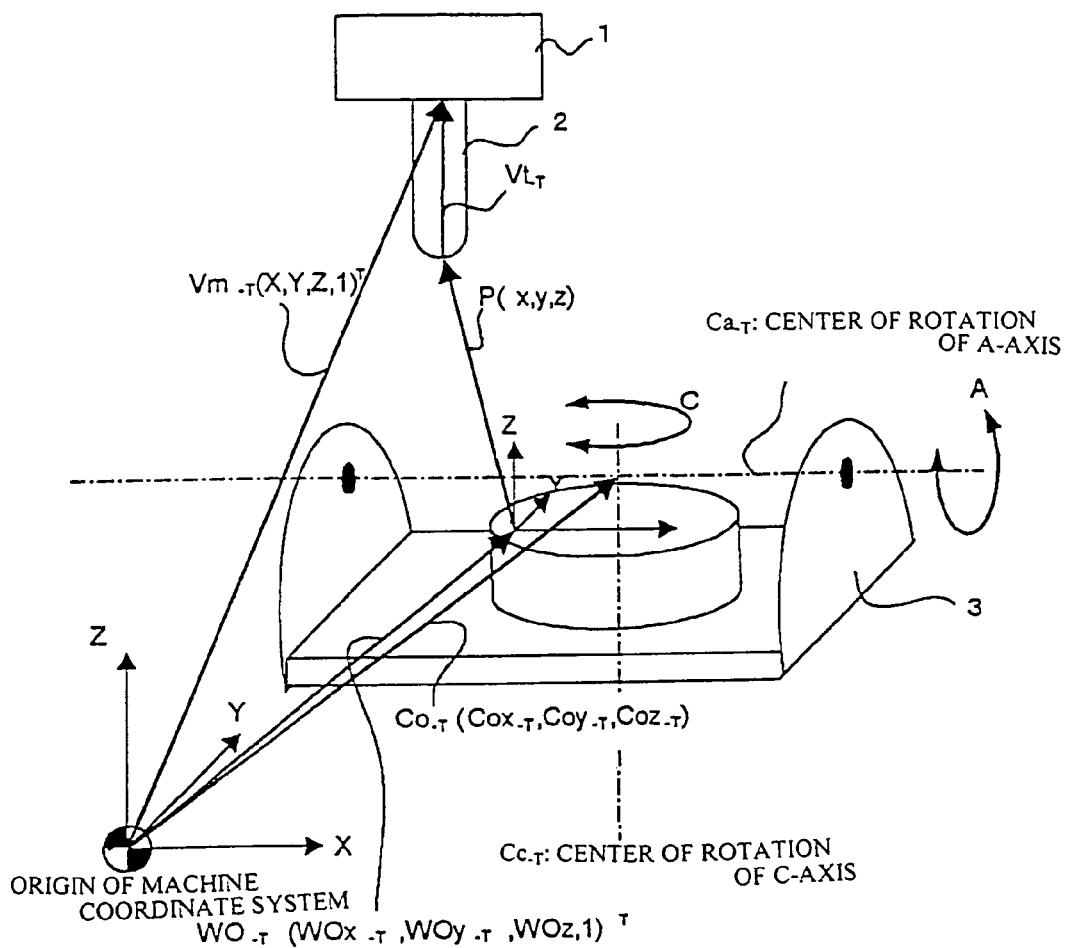
FIG. 7 is a diagram illustrating the manner in which the machine position is computed where there is no misalignment, in a machine having axes of rotation A and C on a table.

The second embodiment of the present invention is an example of a machine in which a table to which a workpiece is mounted rotates on two axes of rotation. The machine has an A-axis (rotating about the X-axis) and a C-axis (rotating about the Z-axis), as axes of rotation, as well as the orthogonal axes of linear motion X, Y, and Z. The A-axis serves as a master axis; the C-axis operates on the A-axis; and the center of rotation of the A-axis $Ca_{.T}$ and the center of rotation of the C-axis $Cc_{.T}$ intersect, as shown in FIG. 7. The tool direction is the Z-axis direction.

In the case of the second embodiment, the tool length vector $Vt_{.H}$ $(0, 0, h, 1)^T$, the workpiece origin offset $WO_{.T}$ $(WOx_{.H}, WOy_{.T}, WOz_{.T}, 1)^T$, and the vector $Co_{.T}$ $(Cox_{.T}, Coy_{.T}, Coz_{.T}, 1)^T$ of intersection between the center of rotation of the A-axis $Ca_{.T}$ and the center of rotation of the C-axis $Cc_{.T}$ are given as initial conditions.

(2-1) Method for Computing the Machine Position when there is No Misalignment

When positional instructions R (a, c) in relation to the A- and C-axes of rotation, and the positional instruction values P (x, y, z) in relation to the X, Y, Z coordinates in the table coordinate system (workpiece coordinate system) are given, the machine position $Vm_{.T}$ $(X, Y, Z, 1)^T$ is computed according to the following Eq. (3).

$$Vm_{.T} = Mvt_{.T}*Mad_{.T}*Mcd_{.T}*Mwo_{.T}*P_{.T} \tag{3}$$

The transformation matrices of the elements in Eq. (3) are as follows.

$$P_{\cdot r} = \begin{pmatrix} x \\ y \\ z \\ 1 \end{pmatrix}$$

$$Mwo_{\cdot r} = \begin{pmatrix} 1 & 0 & 0 & WOx_{\cdot r} \\ 0 & 1 & 0 & WOy_{\cdot r} \\ 0 & 0 & 1 & WOz_{\cdot r} \\ 0 & 0 & 0 & 1 \end{pmatrix}$$

$$Mvt_{\cdot r} = \begin{pmatrix} 1 & 0 & 0 & 0 \\ 0 & 1 & 0 & 0 \\ 0 & 0 & 1 & h \\ 0 & 0 & 0 & 1 \end{pmatrix}$$

$$Mcd_{\cdot r} = Mcp_{\cdot r} * Mct_{\cdot r} * Mcm_{\cdot r}$$

$$Mcm_{\cdot r} = \begin{pmatrix} 1 & 0 & 0 & .Cox_{\cdot r} \\ 0 & 1 & 0 & .Coy_{\cdot r} \\ 0 & 0 & 1 & .Coz_{\cdot r} \\ 0 & 0 & 0 & 1 \end{pmatrix}$$

$$Mci_{\cdot r} = \begin{pmatrix} \cos(-c) & -\sin(-c) & 0 & 0 \\ \sin(-c) & \cos(-c) & 0 & 0 \\ 0 & 0 & 1 & 0 \\ 0 & 0 & 0 & 1 \end{pmatrix}$$

$$Mcp_{\cdot r} = \begin{pmatrix} 1 & 0 & 0 & Cox_{\cdot r} \\ 0 & 1 & 0 & Coy_{\cdot r} \\ 0 & 0 & 1 & Coz_{\cdot r} \\ 0 & 0 & 0 & 1 \end{pmatrix}$$

$$Mad_{\cdot r} = Map_{\cdot r} * Mai_{\cdot r} * Mam_{\cdot r}$$

$$Mam_{\cdot r} = \begin{pmatrix} 1 & 0 & 0 & .Cox_{\cdot r} \\ 0 & 1 & 0 & .Coy_{\cdot r} \\ 0 & 0 & 1 & .Coz_{\cdot r} \\ 0 & 0 & 0 & 1 \end{pmatrix}$$

$$Mai_{\cdot r} = \begin{pmatrix} 1 & 0 & 0 & 0 \\ 0 & \cos(-a) & -\sin(-a) & 0 \\ 0 & \sin(-a) & \cos(-a) & 0 \\ 0 & 0 & 0 & 1 \end{pmatrix}$$

$$Map_{\cdot r} = \begin{pmatrix} 1 & 0 & 0 & Cox_{\cdot r} \\ 0 & 1 & 0 & Coy_{\cdot r} \\ 0 & 0 & 1 & Coz_{\cdot r} \\ 0 & 0 & 0 & 1 \end{pmatrix}$$

In other words, the instruction position for a case in which there is no rotation about the axes of rotation A and C is computed by multiplying the vector $P_{\_T}$ of the instructed position P (x, y, z) in the table coordinate system (workpiece coordinate system) by the matrix $Mwo_{\_T}$ whereby the workpiece origin offset vector from the origin of the machine coordinate system to the origin of the table coordinate system (workpiece coordinate system) is added, as shown in FIG. 7. By multiplying the vector of this instruction position by the transformation matrix $Mcd_{\_T}$ whereby the tool is caused to rotate about the C-axis by an equivalent of the instruction position c, the instruction position for a case in which a rotation is made about the C-axis by an equivalent of instruction c is computed. Furthermore, by multiplying the vector of this instruction position by the transformation matrix $Mad_{\_T}$ whereby a rotation is made about A-axis by an equivalent of the instruction position a, the instruction position for a case in which a rotation is made about the A-axis by an equivalent of instruction αis computed. By multiplying the vector of this computed instruction position by the matrix $Mvt_{\_T}$ whereby the tool length vector is added, the machine position $Vm_{\_T}$ is computed.

Comparing Eq. (1) for a head rotary type with Eq. (3) for computing the machine position, the signs of the angles are inverted for the transformation matrices $Mc_{\_H}$ and $Ma_{\_H}$ in Eq. (1) and the transformation matrices $Mci_{\_T}$ and $Mai_{\_T}$ in Eq. (3). This is due to the fact that the head rotates in the instructed direction (when the rotation axis vector is viewed from the tail side thereof toward the tip side, the clockwise direction is a positive rotation) in relation to the instruction angle, but the table rotates in the opposite direction.

(2-2) Elements of Misalignment (Divergence and Incline of the Position of Center Axis of Rotation and the Turning Center of the Spindle)

In the second embodiment (table rotary machine), it is assumed that there are (i) misalignment of the center of rotation of the C-axis, and (ii) misalignment of the center of rotation of the A-axis. Related items for these misalignments are represented by the following symbols.

$Ac_{\_T}$: Actual center of rotation of the C-axis $Cc_{\_T}$: Original center of rotation of the C-axis (reference position)

$Aa_{\_T}$: Actual center of rotation of the A-axis $Ca_{\_T}$: Original center of rotation of the A-axis (reference position)

(i) Misalignment of the Center of Rotation of the C-axis

The misalignment of the actual center of rotation of the C-axis $Ac_{\_T}$ with respect to the original center of rotation of the C-axis (reference position) $Cc_{\_T}$ is represented by the misalignment $\delta c_{\_T}$ ($\delta cx_{\_T}$, $\delta cy_{\_T}$, $\delta cz_{\_T}$) in the X-, Y-, and Z-axes of linear motion, and the rotational misalignment ($\alpha c_{\_T}$, $\beta c_{\_T}$, $\gamma c_{\_T}$) about these X-, Y-, and Z-axes. Here, $$\delta c_{\_T} (\delta cx_{\_T}, \delta cy_{\_T}, \delta cz_{\_T})$$

is represented by the X, Y, and Z components of the divergence distance from the actual center of rotation of the C-axis $Ac_{\_T}$ to the actual center of rotation of the A-axis $Cc_{\_T}$. In other words, this misalignment is represented as a vector to the actual center of rotation of the C-axis from the intersection between the original center of rotation of the C-axis $Cc_{\_T}$ and the original center of rotation of the A-axis $Ca_{\_T}$. Also, $$(\alpha c_{\_T}, \beta c_{\_T}, \gamma c_{\_T})$$

represents the misalignment whereby the actual center of rotation of the C-axis $Ac_{\_T}$ is inclined by rotating $\alpha c_{\_T}$ about the X-axis, $\beta c_{\_T}$ about the Y-axis and $\gamma c_{\_T}$ about the Z-axis from the original center of rotation of the C-axis $Cc_{\_T}$.

(ii) Misalignment of the Center of Rotation of the A-axis

The misalignment of the actual center of rotation of the A-axis $Aa_{\_T}$ with respect to the original center of rotation of the A-axis (reference position) $Ca_{\_T}$ is represented as follows.

$$\delta a_{\_T} (\delta ax_{\_T}, \delta ay_{\_T}, \delta az_{\_T})$$

This misalignment is represented by the X, Y, and Z components of the distance of divergence from the original center of rotation of the A-axis $Ca_{\_T}$ to the actual center of rotation of the A-axis $Aa_{\_T}$. In other words, this misalignment is represented as a vector to the actual center of rotation of the A-axis from the intersection between the original center of rotation of the C-axis $Cc_{\_T}$ and the original center of rotation of the A-axis $Ca_{\_T}$. Also, $$(\alpha a_{\_T}, \beta a_{\_T}, \gamma a_{\_T})$$

represents the misalignment whereby the actual center of rotation of the A-axis $Aa_{\_T}$ is inclined by rotating $\alpha a_{\_T}$ about the X-axis, $\beta a_{\_T}$ about the Y-axis and $\gamma a_{\_T}$ about the Z-axis from the original center of rotation of the A-axis $Ca_{\_T}$.

In the second embodiment, it is assumed that there is no misalignment with respect to the tool length vector $Vt_{\_T}$.

(2-3) Computing the Machine Position when there is Misalignment

The machine position for a machine which has misalignment in the second embodiment is given by the following equation (Eq. (4)), in association with Eq. (3) which determines the position of a machine which has no misalignment, as described above.

$$Vm_{\_T}' = Mvt_{\_T} * Mad_{\_T}' * Mcd_{\_T}' * Mwo_{\_T} * P_{\_T} \quad (4)$$

The transformation matrices of the elements shown in Eq. (4) are as follows.

The vector $P_{\_T}$ of the instruction position P (x, y, z), the transformation matrix $Mwo_{\_T}$ of the workpiece origin offset $WO_{\_T}$ $(WOx_{\_T}, WOy_{\_T}, WOz_{\_T}, 1)^T$, the matrix $Mvt_{\_T}$ of the tool length vector $Vt_{\_T}$ $(0, 0, h, 1)^T$ are as described above.

Figure 8:
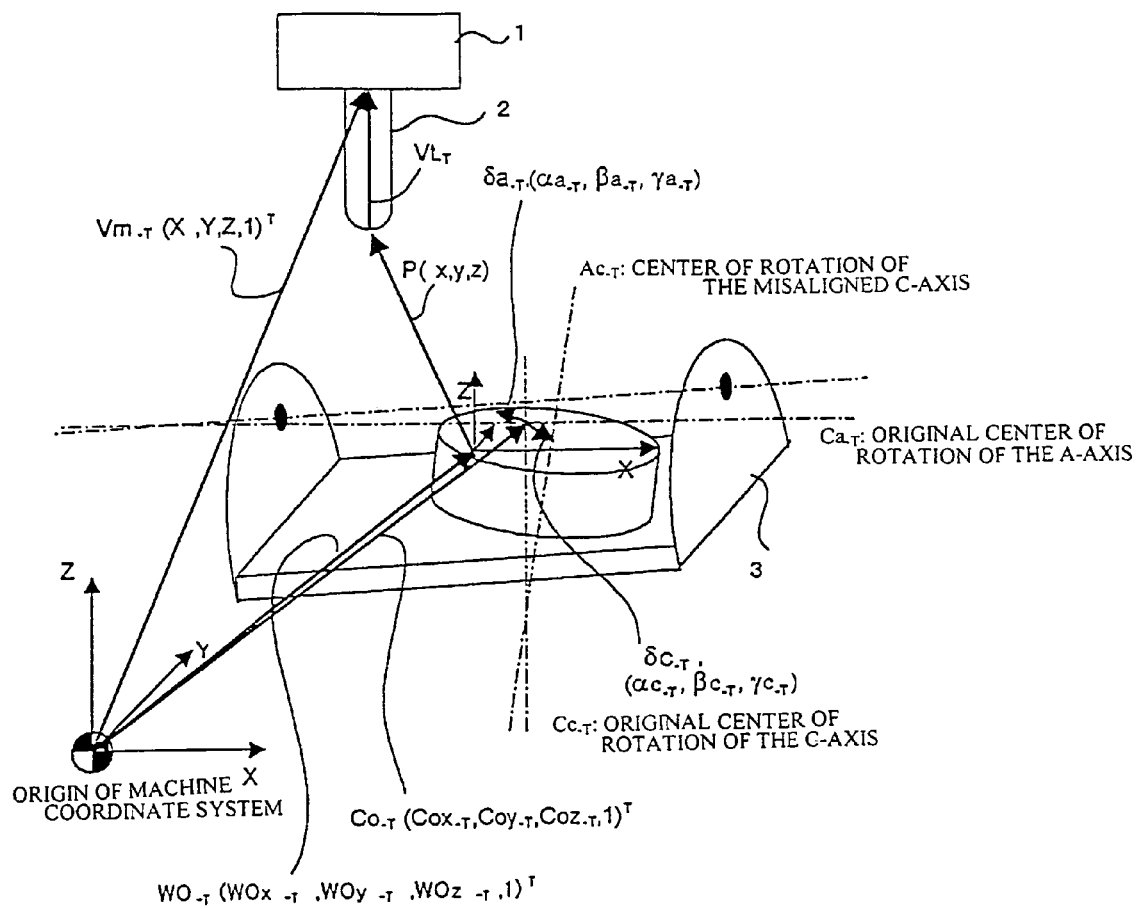
FIG. 8 is a diagram illustrating the manner in which the machine position is computed when there is misalignment, in a machine having axes of rotation A and C on a table.

The vector $P_{\_T}$ of the instruction position P (x, y, z) in the table coordinate system is multiplied by the matrix $Mwo_{\_T}$ whereby the vector of the workpiece origin offset $WO_{\_T}$ is added so that the instruction position in the machine coordinate system is computed, as shown in FIG. 8. The computed instruction position is multiplied by the transformation matrix $Mcd_{\_T}'$ that includes the misalignment $\delta c_{\_T}$ ($\delta cx_{\_T}, \delta cy_{\_T}, \delta cz_{\_T}$) of the C-axis in the direction of the X-, Y-, and Z-axes and the rotational misalignment ($\alpha c_{\_T}, \beta c_{\_T}, \gamma c_{\_T}$) of the C-axis about these X-, Y-, and Z-axes and the instruction c to the C-axis so that the misalignment of the C-axis is corrected, and the position resulting from the rotation of the C-axis by an equivalent of instruction c is computed. Further, this computed position is multiplied by the transformation matrix $Mad_{\_T}'$ that includes the misalignment $\delta a_{\_T}$ ($\delta ax_{\_T}, \delta ay_{\_T}, \delta az_{\_T}$) of the A-axis in the direction of the X-, Y-, and Z-axes; the rotational misalignment ($\alpha a_{\_T}, \beta a_{\_T}, \gamma a_{\_T}$) of the A-axis about these X-, Y-, and Z-axes and $$Mcd'_r = Mcp'_r * Mci'_r * Mcm'_r$$

$$Mcm'_r = \begin{pmatrix} 1 & 0 & 0 & .Cox_r - \delta cx_r \\ 0 & 1 & 0 & .Coy_r - \delta cy_r \\ 0 & 0 & 1 & .Coz_r - \delta cz_r \\ 0 & 0 & 0 & 1 \end{pmatrix}$$

$$Mcp'_r = \begin{pmatrix} 1 & 0 & 0 & Cox_r + \delta cx_r \\ 0 & 1 & 0 & Coy_r + \delta cy_r \\ 0 & 0 & 1 & Coz_r + \delta cz_r \\ 0 & 0 & 0 & 1 \end{pmatrix}$$

$$Mci'_r = \begin{pmatrix} \cos(-c) & \sin(-c) & \beta c_{,r} * (1 - \cos(-c)) + \alpha c_{,r} * \sin(-c) & 0 \\ -\sin(-c) & \cos(-c) & -\alpha c_{,r} * (1 - \cos(-c)) + \beta c_{,r} * \sin(-c) & 0 \\ \beta c_{,r} * (1 - \cos(-c)) - \alpha c_{,r} * \sin(-c) & -\alpha c_{,r} * (1 - \cos(-c)) - \beta c_{,r} * \sin(-c) & 1 & 0 \\ 0 & 0 & 0 & 1 \end{pmatrix}$$

$$Mad'_r = Map'_r * Mai'_r * Mam'_r$$

$$Mam'_r = \begin{pmatrix} 1 & 0 & 0 & .Cox_r - \delta ax_r \\ 0 & 1 & 0 & .Coy_r - \delta ay_r \\ 0 & 0 & 1 & .Coz_r - \delta az_r \\ 0 & 0 & 0 & 1 \end{pmatrix}$$

$$Map'_r = \begin{pmatrix} 1 & 0 & 0 & Cox_r + \delta ax_r \\ 0 & 1 & 0 & Coy_r + \delta ay_r \\ 0 & 0 & 1 & Coz_r + \delta az_r \\ 0 & 0 & 0 & 1 \end{pmatrix}$$

$$Mai'_r = \begin{pmatrix} 1 & \gamma a_{,r} * (1 - \cos(-a)) - \beta a_{,r} * \sin(-a) & -\beta a_{,r} * (1 - \cos(-a)) - \gamma a_{,r} * \sin(-a) & 0 \\ \gamma a_{,r} * (1 - \cos(-a)) + \beta a_{,r} * \sin(-a) & \cos(-a) & \sin(-a) & 0 \\ -\beta a_{,r} * (1 - \cos(-a)) + \gamma a_{,r} * \sin(-a) & -\sin(-a) & \cos(-a) & 0 \\ 0 & 0 & 0 & 1 \end{pmatrix}$$

the instruction α to the A-axis so that the misalignment of the A-axis is corrected, and the position resulting from the rotation of the A-axis by an equivalent of instruction α is computed. This computed position is multiplied by the matrix $Mvt_{-T}$ of the tool length vector $Vt_{-T}$ $(0, 0, h, 1)^T$ to compute the machine position $Vm_{-T}'$.

3. Embodiment 3 of the Present Invention (Machine in which the Tool Head and the Table Rotate)

The third embodiment of the present invention is an example of a machine in which the table 3 is rotated about a rotating axis (C-axis), the tool head 1 is rotated about another rotating axis (B-axis), the C-axis rotates about the Z-axis, and the B-axis rotates about the Y-axis. The tool direction is the Z-axis direction when the positions of the axes of rotation are both zero (B and C=0).

In the third embodiment, the following data is given as the initial conditions.

Tool length vector $Vt_{-T}$ $(0, 0, h, 1)^T$
Workpiece origin offset $WO_{-M}$ $(WOx_{-M}, WOy_{-M}, WOz_{-M}, 1)^T$
Center of rotation of the C-axis $Cc_{-M}$ $(Ccx_{-M}, Ccy_{-M}, Ccz_{-M}, 1)^T$ (3-1) Method for Computing the Machine Position when there is No Misalignment In the third embodiment, the following computations are made and the machine position $Vm_{-M}$ $(x, y, z, 1)^T$ for which the tool length has been corrected is computed when positional instructions R (b, c) are given in relation to the B- and C-axes of rotation, and positional instruction values P (x, y, z) are given in the table coordinate system in relation to X, Y, and Z.

If $Vp_{-M} = Mcd_{-M}*Mwo_{-M}*P_{-M}$ (5) and $Vv_{-M} = Mb_{-M}*Vt_{-M}$ (6), then $Vm_{-M} = Vp_{-M} + Vv_{-M}$ (7).

The elements in Eqs. (5) to (7) are as follows.

$$P_M = \begin{pmatrix} x \\ y \\ z \\ 1 \end{pmatrix}$$

$$Mwo_M = \begin{pmatrix} 1 & 0 & 0 & WOx_M \\ 0 & 1 & 0 & WOy_M \\ 0 & 0 & 1 & WOz_M \\ 0 & 0 & 0 & 1 \end{pmatrix}$$

$Mcd_M = Mcp_M * Mci_M * Mcm_M$ $$Mcm_M = \begin{pmatrix} 1 & 0 & 0 & .Ccx_M \\ 0 & 1 & 0 & .Ccy_M \\ 0 & 0 & 1 & .Ccz_M \\ 0 & 0 & 0 & 1 \end{pmatrix}$$

$$Mci_M = \begin{pmatrix} \cos(-c) & -\sin(-c) & 0 & 0 \\ \sin(-c) & \cos(-c) & 0 & 0 \\ 0 & 0 & 1 & 0 \\ 0 & 0 & 0 & 1 \end{pmatrix}$$

-continued $$Mcp_M = \begin{pmatrix} 1 & 0 & 0 & Ccx_M \\ 0 & 1 & 0 & Ccy_M \\ 0 & 0 & 1 & Ccz_M \\ 0 & 0 & 0 & 1 \end{pmatrix}$$

$$Mb_M = \begin{pmatrix} \cos(b) & 0 & -\sin(b) & 0 \\ 0 & 1 & 0 & 0 \\ \sin(b) & 0 & \cos(b) & 0 \\ 0 & 0 & 0 & 1 \end{pmatrix}$$

Figure 9:
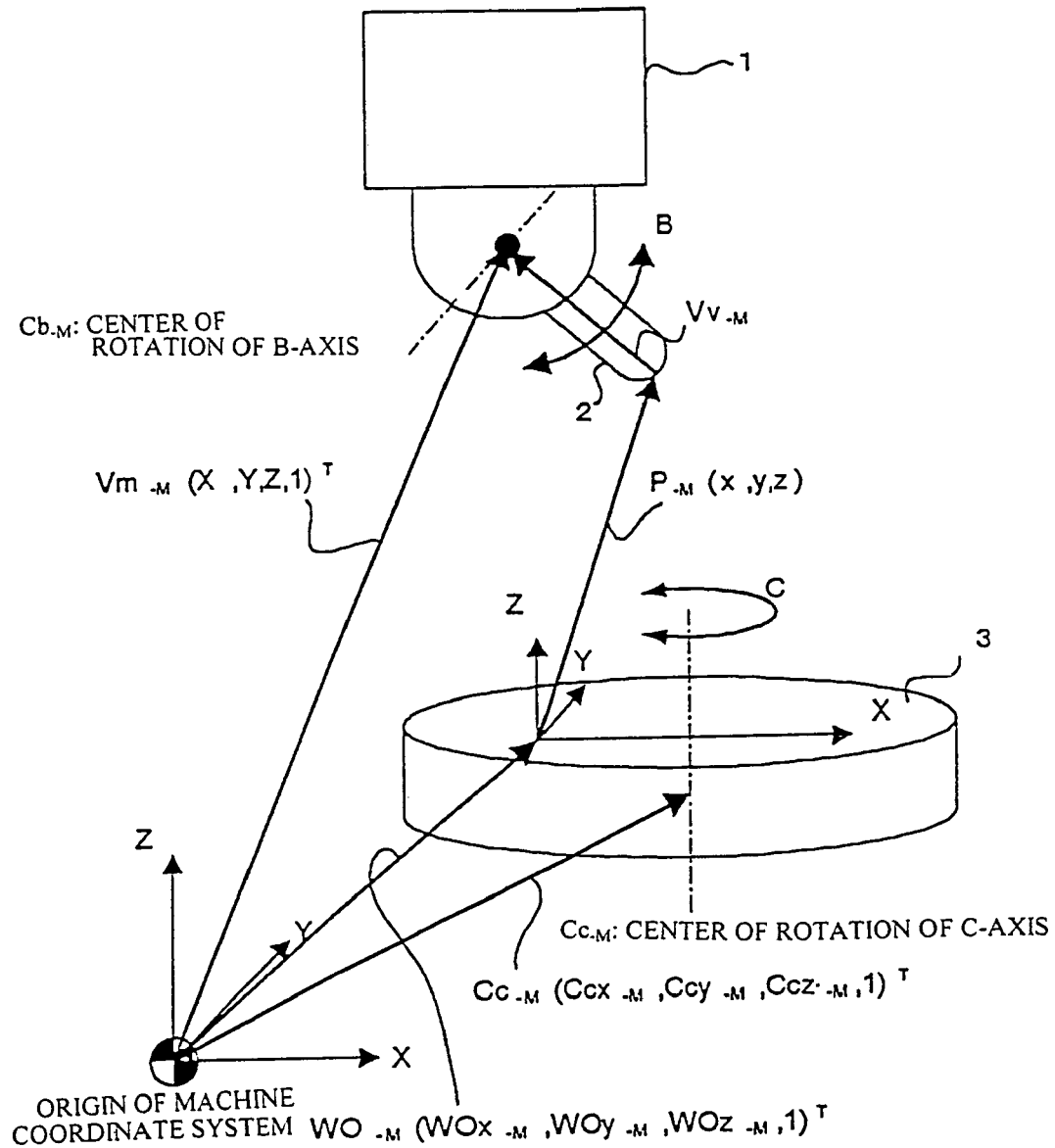
FIG. 9 is a diagram illustrating the manner in which the machine position is computed when there is no misalignment, in a machine having an axis of rotation on a tool head and a table.

In other words, the vector $P_{-M}$ that shows the positional instruction values P (x, y, z) in the table coordinate system is multiplied by the matrix $Mwo_{-M}$ whereby the vector of the workpiece origin offset $WO_{-M}$ $(WOx_{-M}, WOy_{-M}, WOz_{-M}, 1)^T$ is added, and then the result is multiplied by the rotation transformation matrix $Mcd_{-M}$ of the rotation instruction c for the C-axis to compute the instruction position $Vp_{-M}$ after the C-axis has been rotated by an equivalent of instruction c (Eq. (5)), as shown in FIG. 9.

The tool length vector $Vt_{-M}$ rotation is multiplied by the transformation matrix $Mb_{-M}$ whereby the B-axis is allowed to rotate by an equivalent of instruction b to compute the tool length vector $Vt_{-M}$ in which the B-axis has been rotated by an equivalent of instruction b (Eq. (6)).

The machine position $Vm_{-M}$ is determined by adding the tool length vector $Vv_{-M}$ in which the B-axis has been allowed to rotate by an equivalent of instruction b to the instruction position $Vp_{-M}$ after the C-axis has been rotated by an equivalent of instruction c, as shown in Eq. (7).

(3-2) Elements of Misalignment (Divergence and Incline of the Position of the Center Axis of Rotation and the Turning Center of the Spindle)

In the third embodiment (tool head and table rotary machine), it is assumed that there is (i) misalignment of the center of rotation of the C-axis, and (ii) misalignment of the center of rotation of the B-axis. Related items for these misalignments are represented by the following symbols.

$Ac_{-M}$: Actual center of rotation of the C-axis
$Cc_{-M}$: Original center of rotation of the C-axis (reference position)
$Ab_{-M}$: Actual center of rotation of the B-axis
$Cb_{-M}$: Original center of rotation of the B-axis (reference position)

(i) Misalignment of the Center of Rotation of the C-axis

The misalignment of the actual center of rotation of the C-axis $Ac_{-M}$ with respect to the original center of rotation of the C-axis (reference position) $Cc_{-M}$ is represented by the misalignment $\delta c_{-M}$ ($\delta cx_{-M}$, $\delta cy_{-M}$, $\delta cz_{-M}$) in the direction of the X-, Y-, and Z-axes of linear motion, and the rotational misalignment ($\alpha c_{-M}$, $\beta c_{-M}$, $\gamma c_{-M}$) about these X-, Y-, and Z-axes. Here, $\delta c_{-M}$ ($\delta cx_{-M}$, $\delta cy_{-M}$, $\delta cz_{-M}$)

are the X, Y, and Z components of the divergence distance from the actual center of rotation of the C-axis $Ac_{-M}$ to the original center of rotation of the C-axis $Cc_{-M}$. Also, ($\alpha c_{-M}$, $\beta c_{-M}$, $\gamma c_{-M}$)

represents the misalignment whereby the actual center of rotation of the C-axis $Ac_{-M}$ is inclined by rotating $\alpha c_{-M}$ about the X-axis, $\beta c_{-M}$ about the Y-axis and $\gamma c_{-M}$ about the Z-axis from the original center of rotation of the C-axis $Cc_{-M}$.

(ii) Misalignment of the Center of Rotation of the B-axis

The misalignment of the actual center of rotation of the B-axis $Ab_{-M}$ with respect to the original center of rotation of the B-axis (reference position) $Cb_{-M}$ is represented as follows.

$$\delta b_{-M} (\delta bx_{-M}, \delta by_{-M}, \delta bz_{-M})$$

This misalignment is represented by the X, Y, and Z components of the distance of divergence from the original center of rotation of the B-axis $Cb_{-M}$ to the actual center of rotation of the B-axis $Ab_{-M}$. Also, $$(\alpha b_{-M}, \beta b_{-M}, \gamma b_{-M})$$

represents the fact that the actual center of rotation of the B-axis $Ab_{-M}$ is rotated $\alpha b_{-M}$ about the X-axis, $\beta b_{-M}$ about the Y-axis, and $\gamma b_{-M}$ about the Z-axis, and is inclined from the original center of rotation of the B-axis $Cb_{-M}$.

It is assumed here that there is no misalignment with respect to the tool length vector $Vt_{-M}$.

(3-3) Computing the Machine Position when there is Misalignment

The machine position for a machine which has misalignment in the third embodiment is given by the following equations (Eq. (8) to Eq. (10)), in association with Eq. (5) to Eq. (7) which determines the position of a machine which has no misalignment, as described above.

$$Vp_{-M}' = Mcd_{-M}' * Mwo_{-M} * P_{-M} \qquad (8)$$

$$Vv_{-M}' = Mb_{-M}' * \delta b_{-M} * Vt_{-M} \qquad (9)$$

$$Vm_{-M}' = Vp_{-M}' + Vv_{-M}' \qquad (10)$$

The elements in Eqs. (8) to (10) are as follows.

Figure 10:
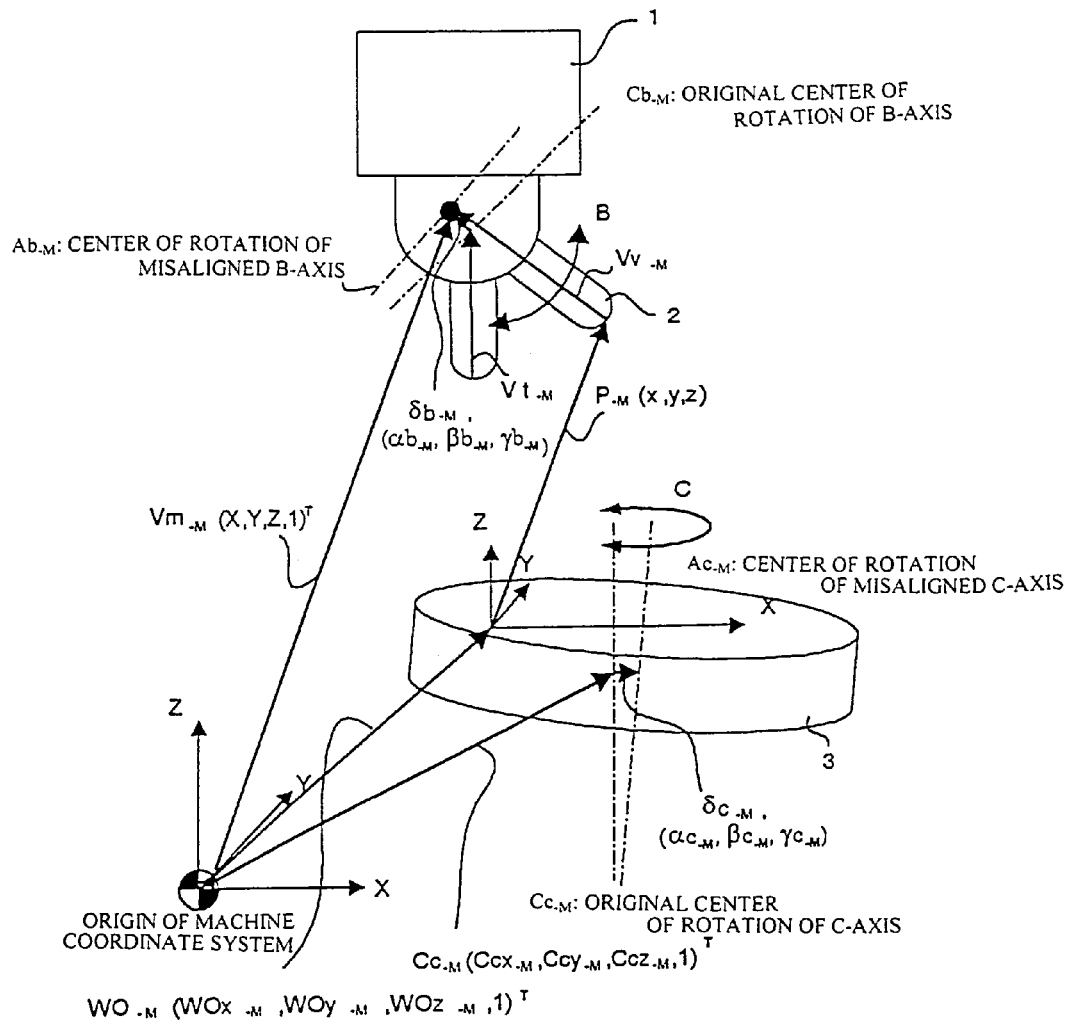
FIG. 10 is a diagram illustrating the manner in which the machine position is computed when there is misalignment, in a machine having an axis of rotation on a tool head and a table.

In other words, the vector $P_{-M}$ that shows the positional instruction values P (x, y, z) in the table coordinate system is multiplied by the matrix $Mwo_{-M}$ whereby the vector of the workpiece origin offset $WO_{-M}$ ($WOx_{-M}$, $WOy_{-M}$, $WOz_{-M}$, $1)^T$ is added to compute the instruction position in the machine coordinate system, as shown in FIG. 10. This computed instruction position is then multiplied by the transformation matrix $Mcd_{-M}'$ that includes the instruction c for the C-axis, the rotation misalignment $\delta c_{-M}$ ($\delta cx_{-M}$, $\delta cy_{-M}$, $\delta cz_{-M}$) of the C-axis in the direction of the X-, Y-, and Z-axes, and the rotational misalignment ($\alpha c_{-M}$, $\beta c_{-M}$, $\gamma c_{-M}$) of the C-axis about these X-, Y-, and Z-axes so that the misalignment of the C-axis is corrected and the instruction position $Vp_{-M}'$ in which the C-axis has been rotated by an equivalent of instruction c is computed (Eq. (8)).

The tool length vector $Vt_{-M}$ is multiplied by the matrix $\delta b_{-M}$ whereby the vector of the misalignment of the X, Y, and Z components of the B-axis is added so that the rotational misalignment of the B-axis is corrected, and the result is multiplied by the transformation matrix $Mb_{-M}'$ whereby the B-axis is rotated by an equivalent of instruction b so that the rotational misalignment of the B-axis is corrected, and the tool length vector $Vv_{-M}'$ in which the B-axis has been rotated by an equivalent of instruction b is computed (Eq. (9)).

The machine position $Vm_{-M}'$ is determined by adding the tool length vector $Vv_{-M}'$ in which the B-axis has been rotated by an equivalent of instruction b to the instruction position $Vp_{-M}'$ after the C-axis has been rotated by an equivalent of instruction c, as shown in Eq. (10).

(4) Other Machines

The case in which the turning center of the spindle was misaligned from the reference position was described solely for tool head rotary machines, but application may also be $$Mcd_M' = Mcp_M' * Mci_M' * Mcm_M'$$

$$Mcm_M' = \begin{pmatrix} 1 & 0 & 0 & .Ccx_M - \delta cx_M \\ 0 & 1 & 0 & .Ccy_M - \delta cy_M \\ 0 & 0 & 1 & .Ccz_M - \delta cz_M \\ 0 & 0 & 0 & 1 \end{pmatrix}$$

$$Mcp_M' = \begin{pmatrix} 1 & 0 & 0 & Ccx_M + \delta cx_M \\ 0 & 1 & 0 & Ccy_M + \delta cy_M \\ 0 & 0 & 1 & Ccz_M + \delta cz_M \\ 0 & 0 & 0 & 1 \end{pmatrix}$$

$$Mci_M' = \begin{pmatrix} \cos(-c) & \sin(-c) & \beta c_M * (1 - \cos(-c)) + \alpha c_M * \sin(-c) & 0 \\ -\sin(-c) & \cos(-c) & -\alpha c_M * (1 - \cos(-c))0 + \beta c_M * \sin(-c) & 0 \\ \beta c_M * (1 - \cos(-c)) - \alpha c_M * \sin(-c) & -\alpha c_M * (1 - \cos(-c)) - \beta c_M * \sin(-c) & 1 & 0 \\ 0 & 0 & 0 & 1 \end{pmatrix}$$

$$\delta b_M = \begin{pmatrix} 1 & 0 & 0 & \delta bx_M \\ 0 & 1 & 0 & \delta by_M \\ 0 & 0 & 1 & \delta bz_M \\ 0 & 0 & 0 & 1 \end{pmatrix}$$

$$Mb_M' = \begin{pmatrix} \cos(b) & -\gamma b_M * (1 - \cos(b)) + \alpha b_M * \sin(b) & -\sin(b) & 0 \\ -\gamma b_M * (1 - \cos(b)) - \alpha b_M * \sin(b) & 1 & \alpha b_M * (1 - \cos(b)) - \gamma_M * \sin(b) & 0 \\ \sin(b) & \alpha b_M * (1 - \cos(b)) + \gamma b_M * \sin(b) & \cos(b) & 0 \\ 0 & 0 & 0 & 1 \end{pmatrix}$$

made in the same manner to table rotary machines, and machines in which a tool head and a table rote.

Figure 11:
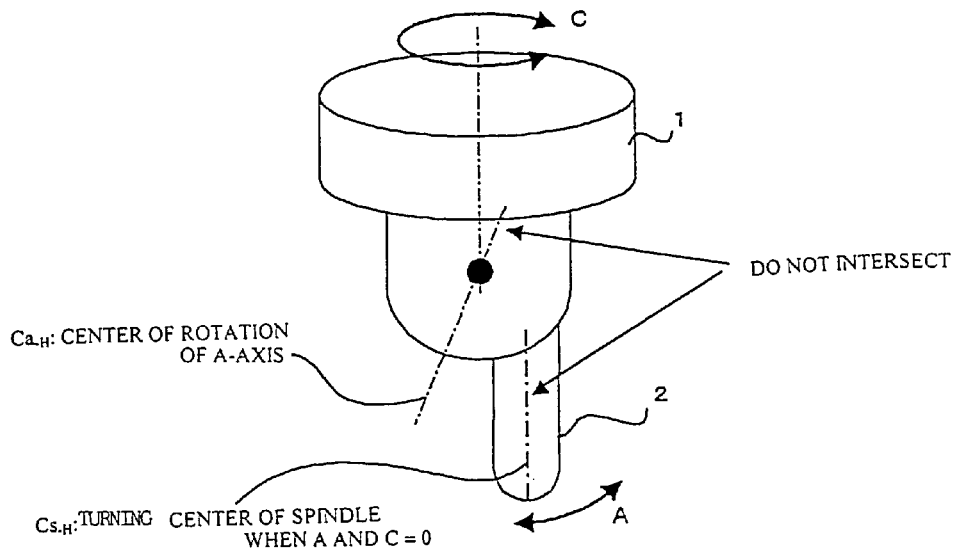
FIG. 11 is a diagram illustrating a machine in which the turning center of the spindle to which the present invention is applicable does not intersect with the center of rotation of the A-axis.
Figure 12:
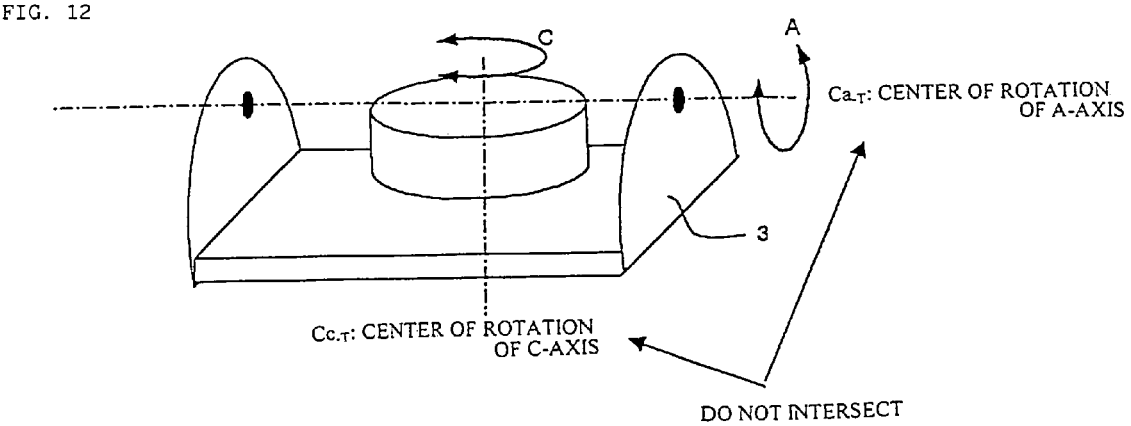
FIG. 12 is a diagram illustrating a machine in which center of rotation of the C-axis and the center of rotation of the A-axis do not intersect in a machine with a rotating table to which the present invention is applicable.

The case in which the turning center of the spindle in a tool head rotary machine is misaligned from the reference position was described, but the present invention may also be applied to cases in which the turning center of the spindle is structurally not at the center of rotation of the axis of rotation on which the spindle is set, namely, to cases in which the turning center of the spindle $Cs_{-H}$ does not intersect with the center of rotation of the A-axis $Ca_{-H}$, as shown in FIG. 11, or to the cases in which the center of rotation of the C-axis $Cc_{-T}$ and the center of rotation of the A-axis $Ca_{-T}$ do not intersect in machines in which a table rotates, as shown in FIG. 12.

The axes of rotation were assumed to be orthogonal in the case of a tool head rotary machine and in the case of a table rotary machine, but application may also be made to cases in which the axes of rotation are not orthogonal.

The structure of the axes of rotation in the above-described embodiments assumed the use of the C- and A-axes in the case of a tool head rotary machine, the A- and C-axes in the case of a table rotary machine, and the C- and B-axes in the case of a machine in which both the tool head and the table rotated, but application may also be made to machines with other axial structures; and application may also be naturally made to machines provided with only a single axis of rotation.

It was assumed that the tool direction was the Z-axis direction when the position of the axis of rotation was zero, but application may naturally be made to other axial directions.

Figure 13:
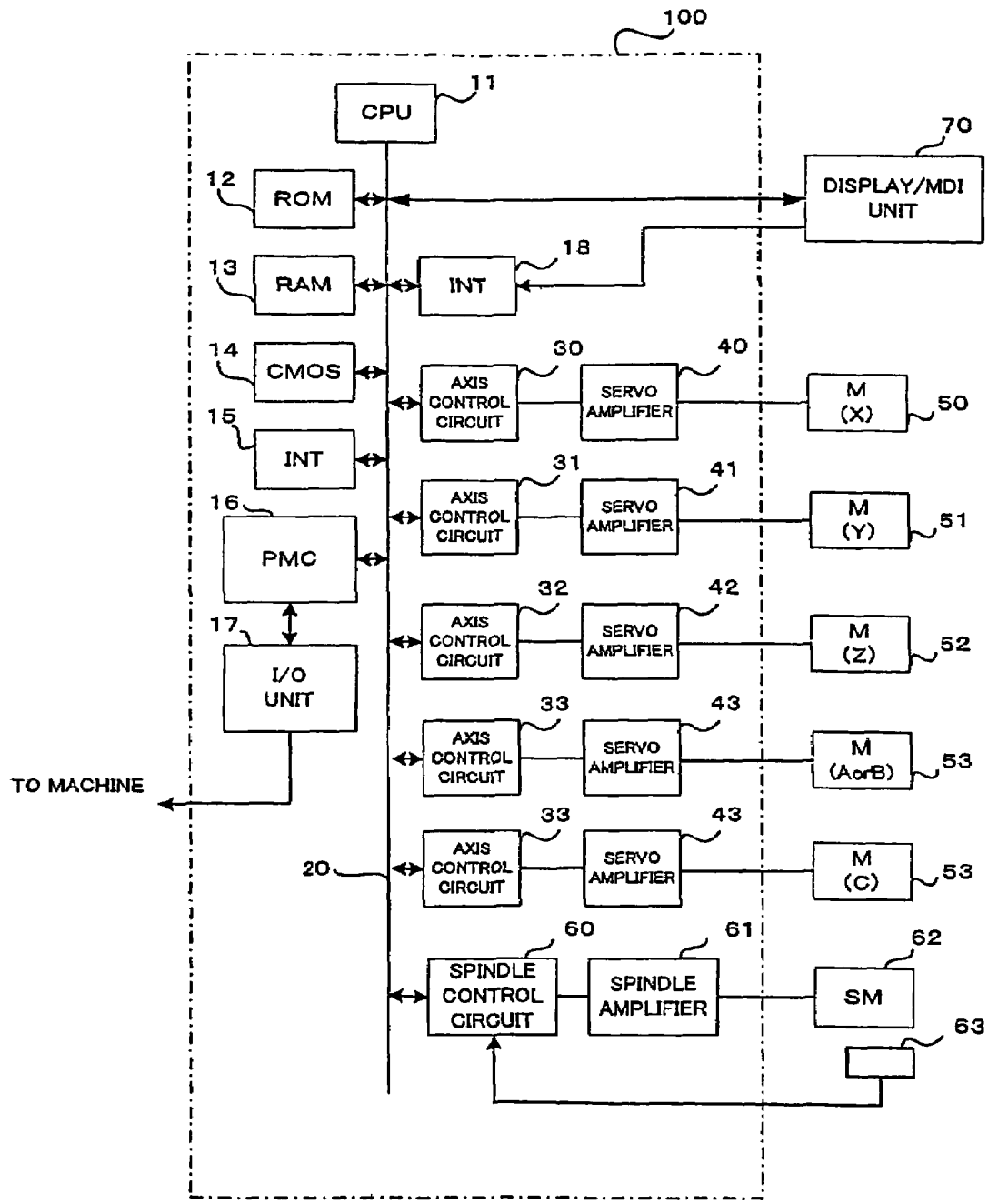
FIG. 13 is a partial block diagram of an embodiment of a numerical control device for correcting the misalignment and the tool length of a machine.

FIG. 13 is a block diagram of a numerical control device that implements the methods in the embodiments for correcting the above-described misalignment and computing the machine position.

CPU 11 is a processor for the comprehensive control of a numerical control device 100. CPU 11 reads a system program stored in ROM 12 by way of a bus 20, and controls the entire numerical control device in accordance with the system program. Temporary calculation data, display data, and various data inputted by an operator by way of a display/MDI unit 70 are stored in RAM 13. A CMOS memory 14 is backed up with a battery (not depicted), and is structured as nonvolatile memory in which the storage condition is maintained even if the power supply for the numerical control device 100 is switched off. A work program read by way of an interface 15, a work program inputted by way of the display/MDI unit 70, and the like are stored in the CMOS memory 14. Software for performing calculations in accordance with Eqs. (1) to (10), which are used to implement the misalignment correction of the present invention, is also stored in the ROM 12.

Interface 15 is one with which it is possible to connect the numerical control device 100 with an adapter or other external equipment 72. Work programs and other data are read from external equipment 71. The work program compiled in the numerical control device 100 is capable of being stored in external storage means by way of the external equipment 72. PMC (programmable machine control device) 16 outputs signals to and controls an auxiliary device (an actuator such as a robot hand for tool replacement, for example) for a machine tool by way of an I/O unit 17 with the aid of a stored sequence program. PMC may sometimes be provided to the machine. Signals are received from switches and other devices on the control panel that is disposed on the main unit of the machine tool, any required signal processing is performed, and the data is thereafter delivered to CPU 11.

The display/MDI unit 70 is a manual data input device equipped with a display, a keyboard, and the like; and an interface 18 receives instructions and data from the keyboard of the CRT/MDI unit 70 and delivers these to CPU 11.

Axial control circuits 30 to 33 for the axes receive movement instruction values for the individual axes from CPU 11 and then output instructions for the axes to servo amplifiers 40 to 43. The servo amplifiers 40 to 43 receive the instructions and drive servomotors 50 to 53 for each axis (the X-, Y-, and Z-axes of linear motion, and the axes of rotation). The servomotors 50 to 53 for the axes include position and velocity detectors, the position and velocity feedback signals from the position and velocity detectors are fed back to the axial control circuits 30 to 33, and feedback control of the position and velocity is performed. The position and velocity feedback is omitted in FIG. 13.

A spindle control circuit 60 receives turning instructions for the spindle, and outputs a spindle velocity signal to a spindle amplifier 61. The spindle amplifier 61 receives the spindle velocity signal and causes a spindle motor 62 to rotate at the instructed rotational velocity. A position coder 63 provides a feedback pulse as feedback to the spindle control circuit 60 to control the velocity in synchronism with the rotation of the spindle motor 62.

The structure of the above-described numerical control device does not differ from the structure of a conventional numerical control device. However, functions not included in a conventional numerical control device have been added such that software for correcting the misalignment of a machine and outputting instruction positions is stored in storage means; the misalignment of divergence and incline of the center of an axis of rotation from the original position is corrected, the misalignment represented by the divergence and incline of the turning center of the spindle from the original position is corrected, movement instructions are outputted to the machine, as described above.

When mounting the numerical control device 100 in a machine, the above-described misalignment is set and registered in the numerical control device in accordance with the type of machine. That is to say, in the first embodiment, in which the machine is a tool head rotary machine with the A- and C-axes as the axes of rotation, $\delta ac_{-H}$ ($\delta acx_{-H}$, $\delta acy_{-H}$, $\delta acz_{-H}$) and ($\alpha c_{-H}$, $\beta c_{-H}$, $\gamma c_{-H}$) are set as the misalignment of the C-axis, $\delta a_{-H}$ ($\delta ax_{-H}$, $\delta ay_{-H}$, $\delta az_{-H}$) and ($\alpha a_{-H}$, $\beta a_{-H}$, $\gamma a_{-H}$) as the misalignment of the A-axis, and $\delta s_{-H}$ ($\delta sx_{-H}$, $\delta sy_{-H}$, $\delta sz_{-H}$) and $\epsilon s_{-H}$ ($\alpha s_{-H}$, $\beta s_{-H}$, $\gamma s_{-H}$) as the misalignment of the spindle.

In the case of the machine with a rotating table described as the second embodiment, $\delta c_{-T}$ ($\delta cx_{-T}$, $\delta cy_{-T}$, $\delta cz_{-T}$) and ($\alpha c_{-T}$, $\beta c_{-T}$, $\gamma c_{-T}$) are set as the misalignment of the C-axis, and $\delta a_{-T}$ ($\delta ax_{-T}$, $\delta ay_{-T}$, $\delta az_{-T}$) and ($\alpha a_{-T}$, $\beta a_{-T}$, $\gamma a_{-T}$) as the misalignment of the A-axis. In the case of the machine described as the third embodiment, $\delta c_{-M}$ ($\delta cx_{-M}$, $\delta cy_{-M}$, $\delta cz_{-M}$) and ($\alpha c_{-M}$, $\beta c_{-M}$, $\gamma c_{-M}$) are set as the misalignment of the C-axis, and $\delta b_{-M}$ ($\delta bx_{-M}$, $\delta by_{-M}$, $\delta bz_{-M}$) and ($\alpha b_{-M}$, $\beta b_{-M}$, $\gamma b_{-M}$) as the misalignment of the B-axis.

These misalignment amounts may be set as parameters provided to the CMOS memory 14 or other means in the numerical control device 100. The error amounts of these may be stored in the machine in advance, and when the machine is connected to the numerical control device 100 the misalignment amount is transmitted from a PLC (programmable logic control device) provided to the machine, and the transmitted misalignment amount is set. The misalignment amount may be received by communication from an external computer by way of the interface 15 or other means, and may then be set.

The type of machine to be connected, in other words, a tool head rotary machine, a table rotary machine, a tool head and table rotary machine, or other type of machine may be set in the numerical control device 100. Other parameters that are set include the tool length, the workpiece origin (workpiece origin offset), the intersection between the center of rotation of the A-axis and the center of rotation of the C-axis in the case of a table rotary machine, and the position of the center of rotation of the C-axis in the case of a tool head and table rotary machine.

Figure 14:
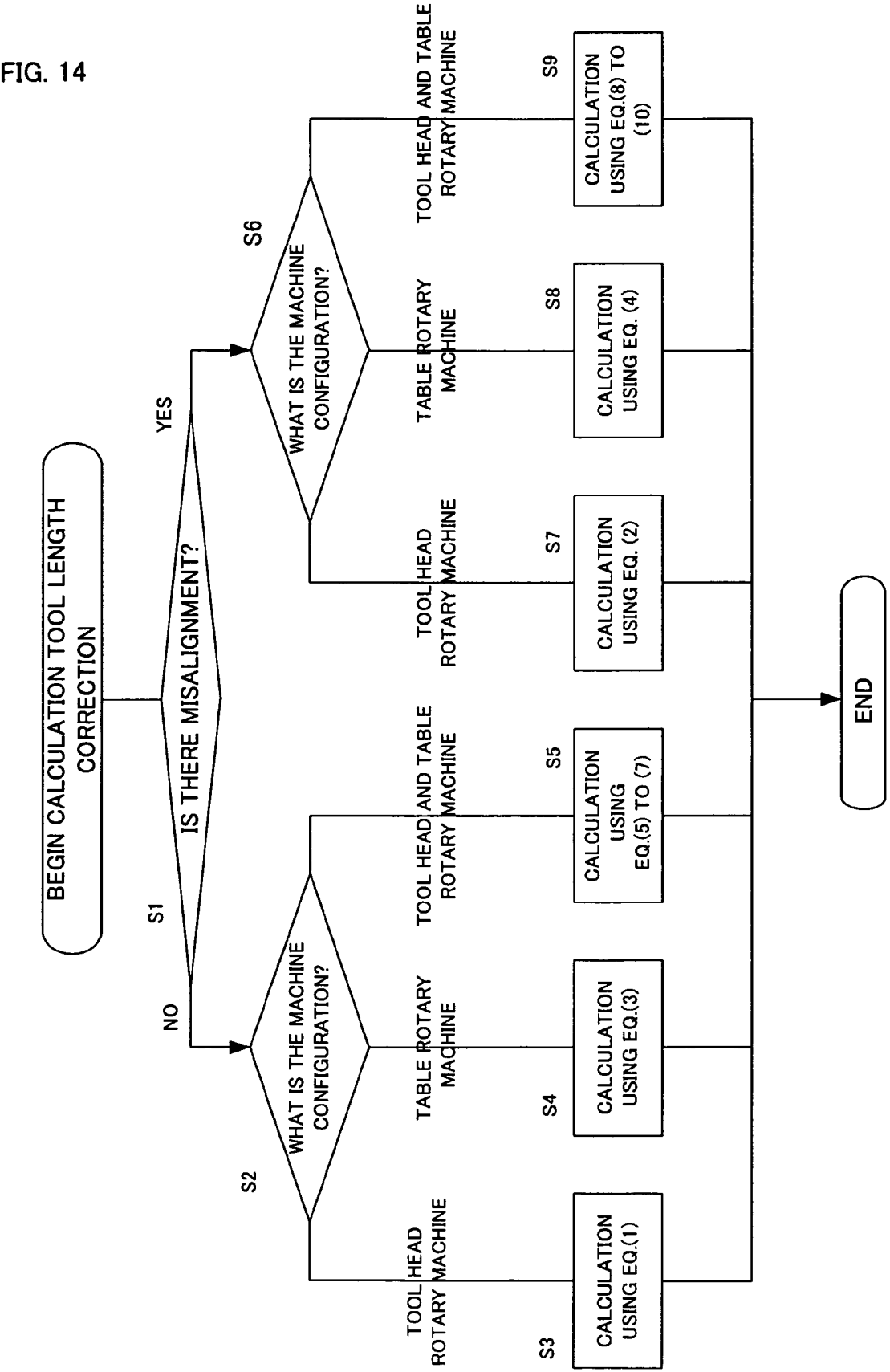
FIG. 14 is a processing flowchart for tool length correction in which an embodiment of the numerical control device in FIG. 13 is implemented.

FIG. 14 is a processing flowchart for tool length correction executed by the numerical control device 100.

First, CPU 11 determines whether or not the misalignment amount is set (step 1); if the misalignment amount is not set, the machine structure (type) that has been set is determined (step 2); and if the machine is a tool head rotary machine, then processing for Eq. (1) is selected (step 3) and the calculation of Eq. (1) is thereafter performed for the positional instruction generated by the program to process the tool length correction.

If the machine is a table rotary machine, then processing for Eq. (3) is selected (step 4), and if the machine is one in which a tool head and a table rotate, then processing for Eqs. (5) to (7) is selected (step 5) and the selected processing is thereafter performed for the positional instruction generated by the program to process the tool length correction.

If the misalignment has been set, the machine structure (type) is determined (step 6); if the machine is a tool head rotary machine, then processing for Eq. (2) is selected (step 7); if the machine is a table rotary machine, then processing for Eq. (4) is selected (step 8); if the machine is one in which a tool head and a table rote, then processing for Eqs. (8) to (10) is selected (step 9); and the selected processing is thereafter performed for the positional instruction generated by the program to process the tool length correction.

It is possible to calculate the tool length correction at each block, but it is also possible to perform the calculation with an interpolated cycle, or with other timing provided in the numerical control device.

As described above, the present invention is capable of high precision work control because even if there is misalignment in the axis of rotation or the turning center of the spindle, the machine position in which the misalignment has been corrected is instructed.

What is claimed is:

1. A numerical control method that uses a numerical control device for a machine, the machine having at least three axes of linear motion, a first axis of rotation for rotating a tool head, and a second axis of rotation for rotating the tool head, the second axis of rotation being arranged above the first axis of rotation, said method comprising:

obtaining a first actual tool length vector for which a tool length vector has been corrected, using a transformation matrix that is made from a reference position at which there is no mechanical error in the turning center of a spindle and an amount of misalignment of an actual turning center of the spindle from the reference position of the turning center of the spindle;

rotating said first actual tool length vector by an amount in correspondence with an instruction for the second axis of rotation, by multiplying the first actual tool length vector by a transformation matrix that is made from a reference position at which there is no mechanical error in the second axis of rotation, an amount of misalignment of an actual second axis of rotation from the reference position, and an instruction position for the second axis of rotation, thereby obtaining a second actual tool length vector for which the misalignment of the second axis of rotation has been corrected;

rotating said second actual tool length vector by an amount in correspondence with an instruction for the first axis of rotation, by multiplying the second actual tool length vector by a transformation matrix that is made from a reference position at which there is no mechanical error in the first axis of rotation, an amount of misalignment of the actual second axis of rotation and an actual first axis of rotation, an amount of misalignment of the actual first axis of rotation from the reference position of the first axis of rotations, and an instruction position for the first axis of rotation, thereby obtaining a third actual tool length vector for which the misalignment of the first axis of rotation has been corrected;

adding an instruction position vector and workpiece origin offset vector to the third actual tool length vector to obtain a machine position; and driving the axes of linear motion and the first axis of rotation and the second axis of rotation to the machine position thus obtained.

2. A numerical control method that uses a numerical control device for a machine, the machine having at least three axes of linear motion, a first axis of rotation for rotating a table, and a second axis of rotation for rotating the table, the second axis of rotation being arranged above the first axis of rotation, said method comprising:

adding, to an instruction position in a table coordinate system, an offset of an origin of the table coordinate system to obtain an instruction position in a machine coordinate system;

rotating the instruction position in the machine coordinate system by an amount in correspondence with an instruction for the second axis of rotation, by multiplying a vector of the instruction position in the machine coordinate system by a transformation matrix that is made from a reference position at which there is no mechanical error in the second axis of rotation, an amount of misalignment of an actual second axis of rotation from the reference position, and an instruction position for the second axis of rotation, thereby obtaining a rotational position of the second axis of rotation for which the misalignment of the second axis of rotation has been corrected;

rotating the rotational position of the second axis of rotation by an amount in correspondence with an instruction for the first axis of rotation, by multiplying a vector of the rotational position of the second axis of rotation by a transformation matrix that is made from a reference position at which there is no mechanical error in the first axis of rotation, an amount of misalignment of an actual first axis of rotation from the reference position, and an instruction position for the first axis of rotation, thereby obtaining a rotational position of the first axis of rotation for which the misalignment of the first axis of rotation has been corrected;

adding a tool length vector to the rotational position of the first axis of rotation to obtain a machine position; and driving the axes of linear motion and the first axis of rotation and the second axis of rotation to the machine position thus obtained.

3. A numerical control method that uses a numerical control device for a machine, the machine having at least three axes of linear motion, at least one axis of rotation for a tool head, and at least one axis of rotation for a table, said method comprising:

adding, to an instruction position in a table coordinate system, an offset of an origin of the table coordinate system to obtain an instruction position in a machine coordinate system;

rotating the instruction position in the machine coordinate system by an amount in correspondence with an instruction for the axis of rotation for the table, by multiplying a vector of the instruction position in the machine coordinate system by a transformation matrix that is made from a reference position at which there is no mechanical error in the axis of rotation for the table, an amount of misalignment of an actual axis of rotation for the table from the reference position, and an instruction position for the axis of rotation for the table, thereby obtaining a rotational position of the axis of rotation for the table for which the misalignment of the axis of rotation for the table has been corrected;

rotating a tool length vector of the tool by an amount head in correspondence with an instruction for the axis of rotation for the tool head, by multiplying the tool length vector by a transformation matrix that is made from a reference position at which there is no mechanical error in the axis of rotation for the tool head, an amount of misalignment of an actual axis of rotation for the tool head from the reference position, and an instruction position for the axis of rotation for the tool head, thereby obtaining a rotational position of the axis of rotation for the tool head for which the misalignment of the axis of rotation for the tool head has been corrected;

obtaining a machine position in accordance with the rotational position of the axis of rotation for the table and the rotational position of the axis of rotation for the tool head; and driving the axes of linear motion and the at least one axis of rotation for the tool head and the at least one axis of rotation for the table to the machine position thus obtained.

\* \* \* \* \*

UNITED STATES PATENT AND TRADEMARK OFFICE
CERTIFICATE OF CORRECTION

PATENT NO. : 7,283,889 B2
APPLICATION NO. : 10/776248
DATED : October 16, 2007
INVENTOR(S) : Toshiaki Otsuki et al.

It is certified that error appears in the above-identified patent and that said Letters Patent is hereby corrected as shown below:

On the Title Page, Item 57 - (Abstract), Line 8, change "$\alpha$" to --*a*--.

On the Title Page, Item 57 - (Abstract), Line 12, change "$\alpha$" to --*a*--.

Column 5, Line 58, change "cos(x)" to --cos(c)--.

Column 6, Line 64, change "$\alpha a c_{-H}$" to --$\alpha c_{-H}$--.

Column 7, Line 35, change "$g s_{-H}$" to --$\gamma s_{-H}$--.

Column 8, Line 18, change "$\alpha$" to --*a*--.

Column 8, Line 29, change "$\alpha$" to --*a*--.

Column 9, Line 45, change "$\alpha$" to --*a*--.

Column 11, Line 18, change "$Mct_{,r}$" to --$Mci_{,r}$--.

Column 11, Line 22, change "$Mem_{,r}$" to --$Mcm_{,r}$--.

Column 12, Line 5, change "$\alpha is$" to --*a* is--.

Column 15, Line 1, change "$\alpha$" to --*a*--.

Column 15, Line 3, change "$\alpha$" to --*a*--.

Column 18, Line 48, change "cos(-c)0" to --cos(-c))--.

Column 22, Line 15, change "rotations," to --rotation,--.

UNITED STATES PATENT AND TRADEMARK OFFICE
CERTIFICATE OF CORRECTION

PATENT NO.        : 7,283,889 B2
APPLICATION NO.   : 10/776248
DATED             : October 16, 2007
INVENTOR(S)       : Toshiaki Otsuki et al.

It is certified that error appears in the above-identified patent and that said Letters Patent is hereby corrected as shown below:

Column 23, Line 21, change "rotating a tool length vector of the tool by an amount head in correspondence with" to --rotating a tool length vector of the tool head by an amount in correspondence with--.

Signed and Sealed this

Twenty Second Day of April, 2008

JON W. DUDAS
*Director of the United States Patent and Trademark Office*